US012610331B2

(12) United States Patent
Keshavamurthy et al.

(10) Patent No.: US 12,610,331 B2
(45) Date of Patent: Apr. 21, 2026

(54) APPARATUS, METHOD, AND COMPUTER PROGRAM FOR USE IN SIDELINK SYNCHRONIZATION

(71) Applicant: Nokia Technologies Oy, Espoo (FI)

(72) Inventors: Prajwal Keshavamurthy, Munich (DE); Thomas Haaning Jacobsen, Nørresundby (DK); Renato Barbosa Abreu, Aalborg (DK); Pilar Andres Maldonado, Aalborg (DK); Troels Emil Kolding, Klarup (DK); Jan Torst Hviid, Klarup (DK)

(73) Assignee: Nokia Technologies Oy, Espoo (FI)

( * ) Notice: Subject to any disclaimer, the term of this patent is extended or adjusted under 35 U.S.C. 154(b) by 399 days.

(21) Appl. No.: 18/195,594

(22) Filed: May 10, 2023

(65) Prior Publication Data

US 2023/0370986 A1     Nov. 16, 2023

(30) Foreign Application Priority Data

May 12, 2022     (EP) ..................................... 22172946

(51) Int. Cl.
*H04W 56/00*          (2009.01)
(52) U.S. Cl.
CPC ... *H04W 56/0015* (2013.01); *H04W 56/0055* (2013.01)
(58) Field of Classification Search
None
See application file for complete search history.

(56) References Cited

U.S. PATENT DOCUMENTS

| | | | |
|---|---|---|---|
| 2015/0271771 A1* | 9/2015 | Park ................. | H04W 56/0015 |
| | | | 370/350 |
| 2016/0337992 A1 | 11/2016 | Sheu et al. | |
| 2020/0328776 A1 | 10/2020 | Scholand et al. | |
| 2020/0404606 A1 | 12/2020 | Chervyakov et al. | |
| 2021/0219248 A1 | 7/2021 | Wu et al. | |
| 2021/0243713 A1* | 8/2021 | Ellenbeck ........... | H04W 56/002 |

(Continued)

FOREIGN PATENT DOCUMENTS

WO     WO 2021/162709 A1     8/2021

OTHER PUBLICATIONS

EESR (EP22172946.0) Oct. 26, 2022, 5 pgs.

(Continued)

*Primary Examiner* — Saad Khawar
(74) *Attorney, Agent, or Firm* — Lippes Mathias LLP

(57)          ABSTRACT

An apparatus and method are provided for determining that a second sidelink synchronization reference user equipment extends synchronization coverage of a first sidelink synchronization reference user equipment; for determining a first synchronization error between the first sidelink synchronization reference user equipment and the second sidelink synchronization reference user equipment and a second synchronization error between the first sidelink synchronization reference user equipment and the apparatus; and for determining whether to operate the apparatus as a sidelink synchronization reference user equipment and extend the synchronization coverage of the first sidelink synchronization reference user equipment based on the first synchronization error and the second synchronization error.

20 Claims, 11 Drawing Sheets

(56) References Cited

U.S. PATENT DOCUMENTS

| | | |
|---|---|---|
| 2021/0250910 A1 | 8/2021 | Park et al. |
| 2021/0368460 A1 | 11/2021 | Fakoorian et al. |
| 2021/0368466 A1 | 11/2021 | Fakoorian et al. |
| 2021/0392592 A1 | 12/2021 | Ko et al. |

OTHER PUBLICATIONS

Nokia Shanghai Bell "D Issue with Forwarding SIB9 to remote UE", 3GPP, R2-2110470, 3GPP TSG RAN WG2 Meeting #116 Electronic, Elbonia Nov. 1-12, 2021, 2 pgs.

You, Young-Hwan, et al. "Effective Time, Frequency, and Sidelink Synchronization for Cellular Device-to-Device Communications", IEEE V. 15, N 2, Jun. 2021, 10 pgs.

* cited by examiner

Figure 10:
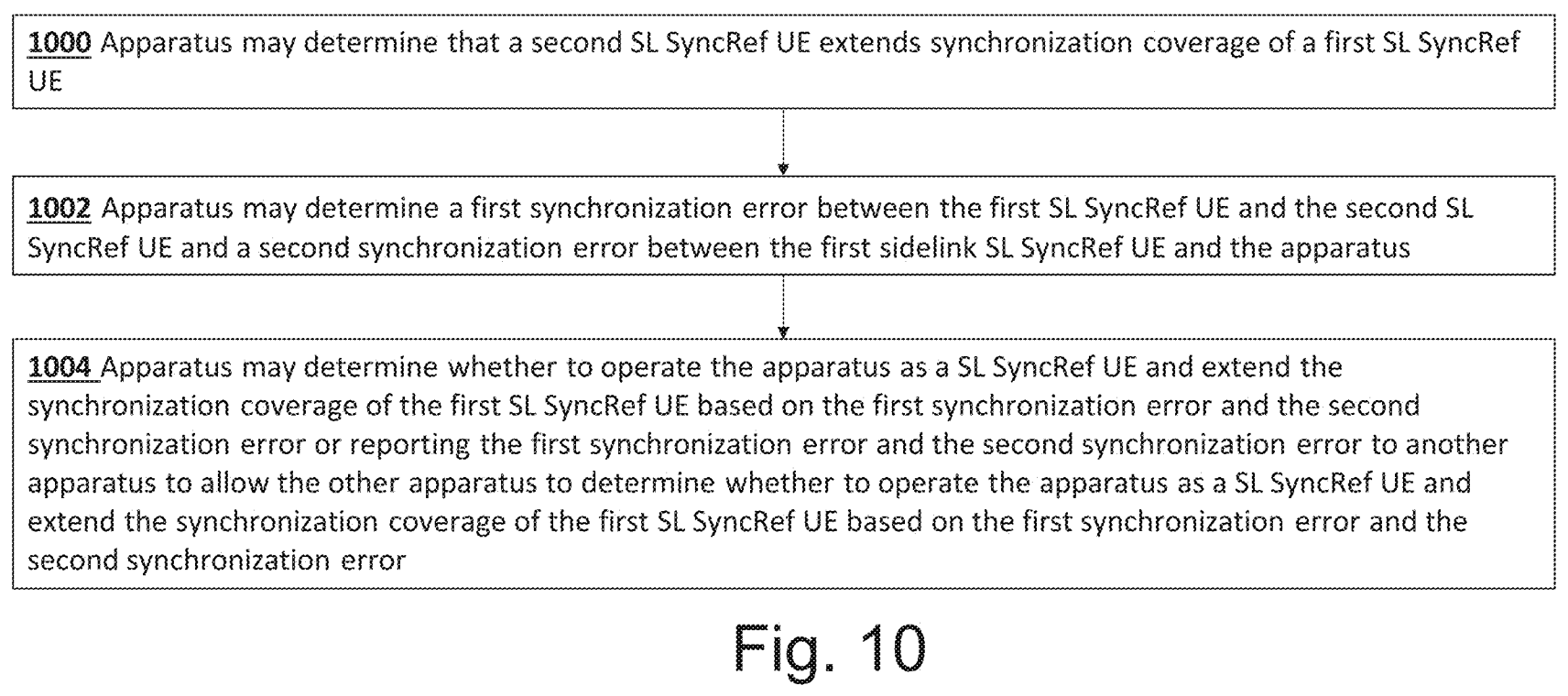

1000 Apparatus may determine that a second SL SyncRef UE extends synchronization coverage of a first SL SyncRef UE

1002 Apparatus may determine a first synchronization error between the first SL SyncRef UE and the second SL SyncRef UE and a second synchronization error between the first sidelink SL SyncRef UE and the apparatus

1004 Apparatus may determine whether to operate the apparatus as a SL SyncRef UE and extend the synchronization coverage of the first SL SyncRef UE based on the first synchronization error and the second synchronization error or reporting the first synchronization error and the second synchronization error to another apparatus to allow the other apparatus to determine whether to operate the apparatus as a SL SyncRef UE and extend the synchronization coverage of the first SL SyncRef UE based on the first synchronization error and the second synchronization error

APPARATUS, METHOD, AND COMPUTER PROGRAM FOR USE IN SIDELINK SYNCHRONIZATION

FIELD OF THE DISCLOSURE

The present disclosure relates to an apparatus, a method, and a computer program for determining whether to operate as a sidelink synchronization reference user equipment and extend the synchronization coverage of another sidelink synchronization reference user equipment in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising: means for determining that a second sidelink synchronization reference user equipment extends synchronization coverage of a first sidelink synchronization reference user equipment; means for determining a first synchronization error between the first sidelink synchronization reference user equipment and the second sidelink synchronization reference user equipment and a second synchronization error between the first sidelink synchronization reference user equipment and the apparatus; and means for determining whether to operate the apparatus as a sidelink synchronization reference user equipment and extend the synchronization coverage of the first sidelink synchronization reference user equipment based on the first synchronization error and the second synchronization error or means for reporting the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

The first sidelink synchronization reference user equipment may be in coverage or out of coverage of a base station or a global navigation satellite system.

Determining that the second sidelink synchronization reference user equipment extends the synchronization coverage of the first sidelink synchronization reference user equipment may be based on at least one of: a first sidelink synchronization identifier transmitted by the first sidelink synchronization reference user equipment; a second sidelink synchronization identifier transmitted by the second sidelink synchronization reference user equipment; a first in coverage indicator indicating whether the first sidelink synchronization reference user equipment is in coverage of a base station or a global navigation synchronization system; or a second in coverage indicator indicating whether the second sidelink synchronization reference user equipment is in coverage of a base station or a global navigation synchronization system.

Determining that the second sidelink synchronization reference user equipment extends the synchronization coverage of the first sidelink synchronization reference user equipment may comprise: determining that the second sidelink synchronization identifier of the second sidelink synchronization reference user equipment is the same as the first sidelink synchronization identifier of the first sidelink synchronization reference user equipment; determining that the first in coverage indicator of the first sidelink synchronization reference user equipment indicates that the first sidelink synchronization reference user equipment is in coverage of a base station or a global navigation synchronization system; and determining that the second in coverage indicator of the second sidelink synchronization reference user equipment indicates that the second sidelink synchronization reference user equipment is out of coverage of a base station or a global navigation synchronization system.

Determining that the second sidelink synchronization reference user equipment extends the synchronization coverage of the first sidelink synchronization reference user equipment may comprise: determining that the second sidelink synchronization identifier of the second sidelink synchronization reference user equipment is equal to the first sidelink synchronization identifier of the first sidelink synchronization reference user equipment plus a known value; determining that the first in coverage indicator of the first sidelink synchronization reference user equipment indicates that the first sidelink synchronization reference user equipment is out of coverage of a base station or a global navigation synchronization system; and determining that the second in coverage indicator of the second sidelink synchronization reference user equipment indicates that the second sidelink synchronization reference user equipment is out of coverage of a base station or a global navigation synchronization system.

Determining the first synchronization error between the first sidelink synchronization reference user equipment and the second sidelink synchronization reference user equipment may comprise: receiving a first sidelink synchronization signal in a first sidelink synchronization signal block from the first sidelink synchronization reference user equipment; receiving a second sidelink synchronization signal in a second sidelink synchronization signal block from the second sidelink synchronization reference user equipment; determining the first synchronization error based on the first sidelink synchronization signal and the second sidelink synchronization signal.

Determining the second synchronization error between the first sidelink synchronization reference user equipment and the apparatus may be based on a first sidelink synchronization signal and/or a level of synchronization accuracy of the apparatus.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is greater than the first synchronization error by a threshold; and determining to not operate the apparatus as a sidelink synchronization reference user equipment and not extend the synchronization coverage of the first sidelink synchronization reference user equipment.

Determining to not operate the apparatus as a sidelink synchronization reference user equipment and not extend the synchronization coverage of the first sidelink synchronization reference user equipment may comprise: determining to stop operating the apparatus as a sidelink synchronization reference user equipment and to stop extending the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is greater than the first synchronization error by a threshold; and determining to operate the apparatus as a sidelink synchronization reference user equipment and extend the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is lower than the first synchronization error by a threshold; and determine to operate the apparatus as a sidelink synchronization reference user equipment and extend the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may further comprise: determining that a signal for the second sidelink synchronization reference user equipment is lower than a signal threshold, wherein the signal threshold is dependent on the first synchronization error or on a difference between the first synchronization error and the second synchronization error; and determine to operate the apparatus as a sidelink synchronization reference user equipment and extend the synchronization coverage of the first sidelink synchronization reference user equipment.

The apparatus may comprise means for: adjusting at least one sidelink synchronization information or transmission parameter of a sidelink synchronization signal block to increase or reduce the probability of being selected as a synchronization source by a neighboring user equipment.

The sidelink synchronization information may comprise an in coverage indicator a or a sidelink synchronization signal identifier.

The transmission parameter may comprise a transmission power.

Adjusting at least one sidelink synchronization information or transmission parameter to increase or reduce the probability of being selected as a synchronization source by a neighboring user equipment may comprise: changing an in coverage indicator to indicate that the apparatus is in coverage of a base station or a global navigation synchronization system to increase the probability of being selected as a synchronization source by a neighboring user equipment; changing an in coverage indicator to indicate that the apparatus is out of coverage of a base station or a global navigation synchronization system to reduce the probability of being selected as a synchronization source by a neighboring user equipment; increasing a transmission power to increase the probability of being selected as a synchronization source by a neighboring user equipment; or reducing a transmission power to reduce the probability of being selected as a synchronization source by a neighboring user equipment.

Operating the apparatus as synchronization reference user equipment may comprise: transmitting sidelink synchronization information in a sidelink synchronization signal block.

The sidelink synchronization information may comprise at least one of a sidelink synchronization signal or a physical sidelink broadcast channel.

The sidelink synchronization signal may comprise at least one of a sidelink primary synchronization signal or a sidelink secondary synchronization signal.

Extending the synchronization coverage of the first sidelink synchronization reference user equipment may comprise: selecting the first sidelink synchronization reference user equipment as a synchronization source to provide a sidelink timing reference.

Operating the apparatus as synchronization reference user equipment may comprise: transmitting a cause indicator indicating a cause for operating the apparatus as synchronization reference user equipment; and/or transmitting an availability indicator indicating the availability of the second synchronization reference user equipment extending the synchronization coverage of the first synchronization reference user equipment.

The cause may comprise that the apparatus provides a reduced synchronization error compared to the second synchronization reference user equipment (i.e the second synchronization error is lower than the first synchronization error by a threshold).

The means may comprise: at least one processor; and at least one memory storing instructions that, when executed by the at least one processor, cause the performance of the apparatus.

According to an aspect there is provided an apparatus comprising at least one processor; and at least one memory storing instructions that, when executed by the at least one processor, cause the apparatus at least to: determine that a second sidelink synchronization reference user equipment extends synchronization coverage of a first sidelink synchronization reference user equipment; determine a first synchronization error between the first sidelink synchronization reference user equipment and the second sidelink synchronization reference user equipment and a second synchronization error between the first sidelink synchronization reference user equipment and an apparatus; and determine whether to operate the apparatus as a sidelink synchronization reference user equipment and extend the synchronization coverage of the first sidelink synchronization reference user equipment based on the first synchronization error and the second synchronization error or report the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

The first sidelink synchronization reference user equipment may be in coverage or out of coverage of a base station or a global navigation satellite system.

Determining that the second sidelink synchronization reference user equipment extends the synchronization coverage of the first sidelink synchronization reference user equipment may be based on at least one of: a first sidelink synchronization identifier transmitted by the first sidelink synchronization reference user equipment; a second sidelink synchronization identifier transmitted by the second sidelink synchronization reference user equipment; a first in coverage indicator indicating whether the first sidelink synchronization reference user equipment is in coverage of a base station or a global navigation synchronization system; or a second in coverage indicator indicating whether the second sidelink synchronization reference user equipment is in coverage of a base station or a global navigation synchronization system.

Determining that the second sidelink synchronization reference user equipment extends the synchronization coverage of the first sidelink synchronization reference user equipment may comprise: determining that the second sidelink synchronization identifier of the second sidelink synchronization reference user equipment is the same as the first sidelink synchronization identifier of the first sidelink synchronization reference user equipment; determining that the first in coverage indicator of the first sidelink synchronization reference user equipment indicates that the first sidelink synchronization reference user equipment is in coverage of a base station or a global navigation synchronization system; and determining that the second in coverage indicator of the second sidelink synchronization reference user equipment indicates that the second sidelink synchronization reference user equipment is out of coverage of a base station or a global navigation synchronization system.

Determining that the second sidelink synchronization reference user equipment extends the synchronization coverage of the first sidelink synchronization reference user equipment may comprise: determining that the second sidelink synchronization identifier of the second sidelink synchronization reference user equipment is equal to the first sidelink synchronization identifier of the first sidelink synchronization reference user equipment plus a known value; determining that the first in coverage indicator of the first sidelink synchronization reference user equipment indicates that the first sidelink synchronization reference user equipment is out of coverage of a base station or a global navigation synchronization system; and determining that the second in coverage indicator of the second sidelink synchronization reference user equipment indicates that the second sidelink synchronization reference user equipment is out of coverage of a base station or a global navigation synchronization system.

Determining the first synchronization error between the first sidelink synchronization reference user equipment and the second sidelink synchronization reference user equipment may comprise: receiving a first sidelink synchronization signal in a first sidelink synchronization signal block from the first sidelink synchronization reference user equipment; receiving a second sidelink synchronization signal in a second sidelink synchronization signal block from the second sidelink synchronization reference user equipment; determining the first synchronization error based on the first sidelink synchronization signal and the second sidelink synchronization signal.

Determining the second synchronization error between the first sidelink synchronization reference user equipment and the apparatus may be based on a first sidelink synchronization signal and/or a level of synchronization accuracy of the apparatus.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is greater than the first synchronization error by a threshold; and determining to not operate the apparatus as a sidelink synchronization reference user equipment and not extend the synchronization coverage of the first sidelink synchronization reference user equipment.

Determining to not operate the apparatus as a sidelink synchronization reference user equipment and not extend the synchronization coverage of the first sidelink synchronization reference user equipment may comprise: determining to stop operating the apparatus as a sidelink synchronization reference user equipment and to stop extending the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is greater than the first synchronization error by a threshold; and determining to operate the apparatus as a sidelink synchronization reference user equipment and extend the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is lower than the first synchronization error by a threshold; and determine to operate the apparatus as a sidelink synchronization reference user equipment and extend the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may further comprise: determining that a signal for the second sidelink synchronization reference user equipment is lower than a signal threshold, wherein the signal threshold is dependent on the first synchronization error or on a difference between the first synchronization error and the second synchronization error; and determine to operate the apparatus as a sidelink synchronization reference user equipment and extend the synchronization coverage of the first sidelink synchronization reference user equipment.

The at least one memory and the computer code may be configured, with the at least one processor, to cause the apparatus at least to perform: adjust at least one sidelink synchronization information or transmission parameter of a sidelink synchronization signal block to increase or reduce the probability of being selected as a synchronization source by a neighboring user equipment.

The sidelink synchronization information may comprise an in coverage indicator a or a sidelink synchronization signal identifier.

The transmission parameter may comprise a transmission power.

Adjusting at least one sidelink synchronization information or transmission parameter to increase or reduce the probability of being selected as a synchronization source by a neighboring user equipment may comprise: changing an in coverage indicator to indicate that the apparatus is in coverage of a base station or a global navigation synchronization system to increase the probability of being selected as a synchronization source by a neighboring user equipment; changing an in coverage indicator to indicate that the apparatus is out of coverage of a base station or a global navigation synchronization system to reduce the probability of being selected as a synchronization source by a neighboring user equipment; increasing a transmission power to increase the probability of being selected as a synchronization source by a neighboring user equipment; or reducing a transmission power to reduce the probability of being selected as a synchronization source by a neighboring user equipment.

Operating the apparatus as synchronization reference user equipment may comprise: transmitting sidelink synchronization information in a sidelink synchronization signal block.

The sidelink synchronization information may comprise at least one of a sidelink synchronization signal or a physical sidelink broadcast channel.

The sidelink synchronization signal may comprise at least one of a sidelink primary synchronization signal or a sidelink secondary synchronization signal.

Extending the synchronization coverage of the first sidelink synchronization reference user equipment may comprise: selecting the first sidelink synchronization reference user equipment as a synchronization source to provide a sidelink timing reference.

Operating the apparatus as synchronization reference user equipment may comprise: transmitting a cause indicator indicating a cause for operating the apparatus as synchronization reference user equipment; and/or transmitting an availability indicator indicating the availability of the second synchronization reference user equipment extending the synchronization coverage of the first synchronization reference user equipment.

The cause may comprise that the apparatus provides a reduced synchronization error compared to the second synchronization reference user equipment (i.e the second synchronization error is lower than the first synchronization error by a threshold).

According to an aspect there is provided an apparatus comprising circuitry configured to perform: determine that a second sidelink synchronization reference user equipment extends synchronization coverage of a first sidelink synchronization reference user equipment; determine a first synchronization error between the first sidelink synchronization reference user equipment and the second sidelink synchronization reference user equipment and a second synchronization error between the first sidelink synchronization reference user equipment and the apparatus; and determine whether to operate the apparatus as a sidelink synchronization reference user equipment and extend the synchronization coverage of the first sidelink synchronization reference user equipment based on the first synchronization error and the second synchronization error or report the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

According to an aspect there is provided a method comprising: determining that a second sidelink synchronization reference user equipment extends synchronization coverage of a first sidelink synchronization reference user equipment; determining a first synchronization error between the first sidelink synchronization reference user equipment and the second sidelink synchronization reference user equipment and a second synchronization error between the first sidelink synchronization reference user equipment and an apparatus; and determining whether to operate the apparatus as a sidelink synchronization reference user equipment and extend the synchronization coverage of the first sidelink synchronization reference user equipment based on the first synchronization error and the second synchronization error or reporting the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

The first sidelink synchronization reference user equipment may be in coverage or out of coverage of a base station or a global navigation satellite system.

Determining that the second sidelink synchronization reference user equipment extends the synchronization coverage of the first sidelink synchronization reference user equipment may be based on at least one of: a first sidelink synchronization identifier transmitted by the first sidelink synchronization reference user equipment; a second sidelink synchronization identifier transmitted by the second sidelink synchronization reference user equipment; a first in coverage indicator indicating whether the first sidelink synchronization reference user equipment is in coverage of a base station or a global navigation synchronization system; or a second in coverage indicator indicating whether the second sidelink synchronization reference user equipment is in coverage of a base station or a global navigation synchronization system.

Determining that the second sidelink synchronization reference user equipment extends the synchronization coverage of the first sidelink synchronization reference user equipment may comprise: determining that the second sidelink synchronization identifier of the second sidelink synchronization reference user equipment is the same as the first sidelink synchronization identifier of the first sidelink synchronization reference user equipment; determining that the first in coverage indicator of the first sidelink synchronization reference user equipment indicates that the first sidelink synchronization reference user equipment is in coverage of a base station or a global navigation synchronization system; and determining that the second in coverage indicator of the second sidelink synchronization reference user equipment indicates that the second sidelink synchronization reference user equipment is out of coverage of a base station or a global navigation synchronization system.

Determining that the second sidelink synchronization reference user equipment extends the synchronization coverage of the first sidelink synchronization reference user equipment may comprise: determining that the second sidelink synchronization identifier of the second sidelink synchronization reference user equipment is equal to the first sidelink synchronization identifier of the first sidelink synchronization reference user equipment plus a known value; determining that the first in coverage indicator of the first sidelink synchronization reference user equipment indicates that the first sidelink synchronization reference user equipment is out of coverage of a base station or a global navigation synchronization system; and determining that the second in coverage indicator of the second sidelink synchronization reference user equipment indicates that the second sidelink synchronization reference user equipment is out of coverage of a base station or a global navigation synchronization system.

Determining the first synchronization error between the first sidelink synchronization reference user equipment and the second sidelink synchronization reference user equipment may comprise: receiving a first sidelink synchronization signal in a first sidelink synchronization signal block from the first sidelink synchronization reference user equipment; receiving a second sidelink synchronization signal in a second sidelink synchronization signal block from the second sidelink synchronization reference user equipment; determining the first synchronization error based on the first sidelink synchronization signal and the second sidelink synchronization signal.

Determining the second synchronization error between the first sidelink synchronization reference user equipment and the apparatus may be based on a first sidelink synchronization signal and/or a level of synchronization accuracy of the apparatus.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is greater than the first synchronization error by a threshold; and determining to not operate the apparatus as a sidelink synchronization reference user equipment and not extend the synchronization coverage of the first sidelink synchronization reference user equipment.

Determining to not operate the apparatus as a sidelink synchronization reference user equipment and not extend the synchronization coverage of the first sidelink synchronization reference user equipment may comprise: determining to stop operating the apparatus as a sidelink synchronization reference user equipment and to stop extending the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is greater than the first synchronization error by a threshold; and determining to operate the apparatus as a sidelink synchronization reference user equipment and extend the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may comprise: determining that the second synchronization error is lower than the first synchronization error by a threshold;

and determine to operate the apparatus as a sidelink synchronization reference user equipment and extend the synchronization coverage of the first sidelink synchronization reference user equipment.

Determining whether to operate the apparatus as a sidelink synchronization reference user equipment and extend the synchronization coverage of the first sidelink synchronization reference user equipment based on the first synchronization error and the second synchronization error may further comprise: determining that a signal for the second sidelink synchronization reference user equipment is lower than a signal threshold, wherein the signal threshold is dependent on the first synchronization error or on a difference between the first synchronization error and the second synchronization error; and determine to operate the apparatus as a sidelink synchronization reference user equipment and extend the synchronization coverage of the first sidelink synchronization reference user equipment.

The method may comprise: adjusting at least one sidelink synchronization information or transmission parameter of a sidelink synchronization signal block to increase or reduce the probability of being selected as a synchronization source by a neighboring user equipment.

The sidelink synchronization information may comprise an in coverage indicator a or a sidelink synchronization signal identifier.

The transmission parameter may comprise a transmission power.

Adjusting at least one sidelink synchronization information or transmission parameter to increase or reduce the probability of being selected as a synchronization source by a neighboring user equipment may comprise: changing an in coverage indicator to indicate that the apparatus is in coverage of a base station or a global navigation synchronization system to increase the probability of being selected as a synchronization source by a neighboring user equipment; changing an in coverage indicator to indicate that the apparatus is out of coverage of a base station or a global navigation synchronization system to reduce the probability of being selected as a synchronization source by a neighboring user equipment; increasing a transmission power to increase the probability of being selected as a synchronization source by a neighboring user equipment; or reducing a transmission power to reduce the probability of being selected as a synchronization source by a neighboring user equipment.

Operating the apparatus as synchronization reference user equipment may comprise: transmitting sidelink synchronization information in a sidelink synchronization signal block.

The sidelink synchronization information may comprise at least one of a sidelink synchronization signal or a physical sidelink broadcast channel.

The sidelink synchronization signal may comprise at least one of a sidelink primary synchronization signal or a sidelink secondary synchronization signal.

Extending the synchronization coverage of the first sidelink synchronization reference user equipment may comprise: selecting the first sidelink synchronization reference user equipment as a synchronization source to provide a sidelink timing reference.

Operating the apparatus as synchronization reference user equipment may comprise: transmitting a cause indicator indicating a cause for operating the apparatus as synchronization reference user equipment; and/or transmitting an availability indicator indicating the availability of the second synchronization reference user equipment extending the synchronization coverage of the first synchronization reference user equipment.

The cause may comprise that the apparatus provides a reduced synchronization error compared to the second synchronization reference user equipment (i.e the second synchronization error is lower than the first synchronization error by a threshold).

According to an aspect there is provided a computer program comprising computer executable code which when run on at least one processor is configured to: determine that a second sidelink synchronization reference user equipment extends synchronization coverage of a first sidelink synchronization reference user equipment; determine a first synchronization error between the first sidelink synchronization reference user equipment and the second sidelink synchronization reference user equipment and a second synchronization error between the first sidelink synchronization reference user equipment and an apparatus; and determine whether to operate the apparatus as a sidelink synchronization reference user equipment and extend the synchronization coverage of the first sidelink synchronization reference user equipment based on the first synchronization error and the second synchronization error or report the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access and Mobility Management Function
API: Application Programming Interface
BS: Base Station
CU: Centralized Unit
DFN: Direct Frame Number
DL: Downlink
DU: Distributed Unit
gNB: gNodeB
GNSS: Global Navigation Satellite System
GSM: Global System for Mobile communication
HSS: Home Subscriber Server
ID: Identifier
IE: Information Element
IoT: Internet of Things
IIoT: Industrial Internet of Things LTE: Long Term Evolution
MAC: Medium Access Control
MIB-SL: Master Information Block Sidelink
MS: Mobile Station
MTC: Machine Type Communication
NEF: Network Exposure Function
NF: Network Function
NR: New radio
NRF: Network Repository Function
PDC: Propagation Delay Compensation
PDU: Packet Data Unit
PSBCH: Physical Sidelink Broadcast Channel
RAM: Random Access Memory
(R)AN: (Radio) Access Network
ROM: Read Only Memory
RTI: Reference Time Information
SCS: SubCarrier Spacing
SFN: System Frame Number
SIB: System Information Block
SL: Sidelink
SMF: Session Management Function
SLSS: Sidelink Synchronization Signal
S-PSS: Sidelink Primary Synchronization Signal
S-SSS: Sidelink Secondary Synchronization Signal
S-SSB: Sidelink Synchronization Signal Block
Sync: Synchronization
SyncRef: Synchronization Reference
TDD: Time Division Duplex
ToD: Time of Day
TR: Technical Report
TS: Technical Specification
TSN: Time Sensitive Networking
UE: User Equipment
UMTS: Universal Mobile Telecommunication System
UTC: Coordinated Universal Time
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 10 shows a block diagram of a method for determining whether to operate as a sidelink synchronization reference user equipment in a communication system.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
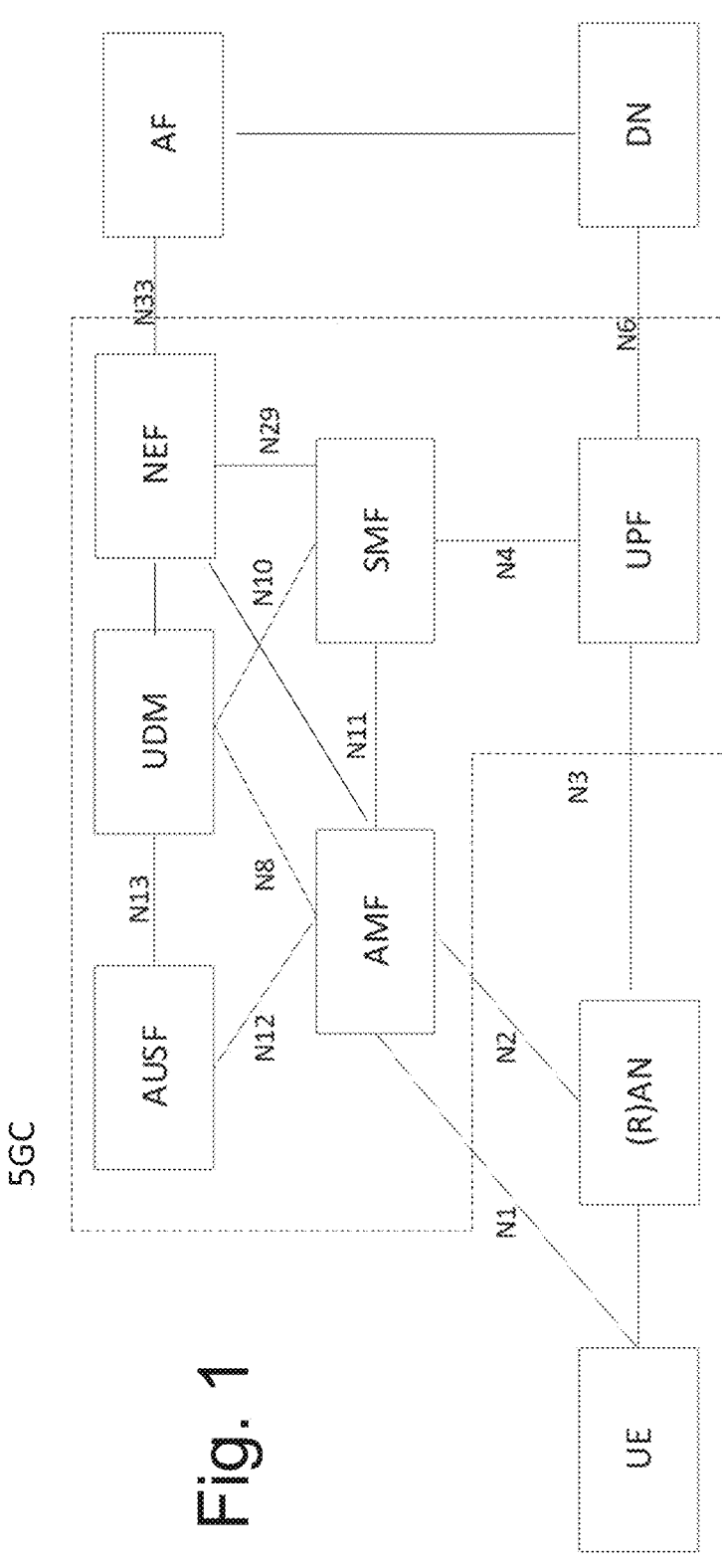
FIG. 1 shows a schematic representation of a 5G system.

FIG. 1 shows a schematic representation of a 5G system (5GS). The 5GS may comprises a user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

Figure 2:
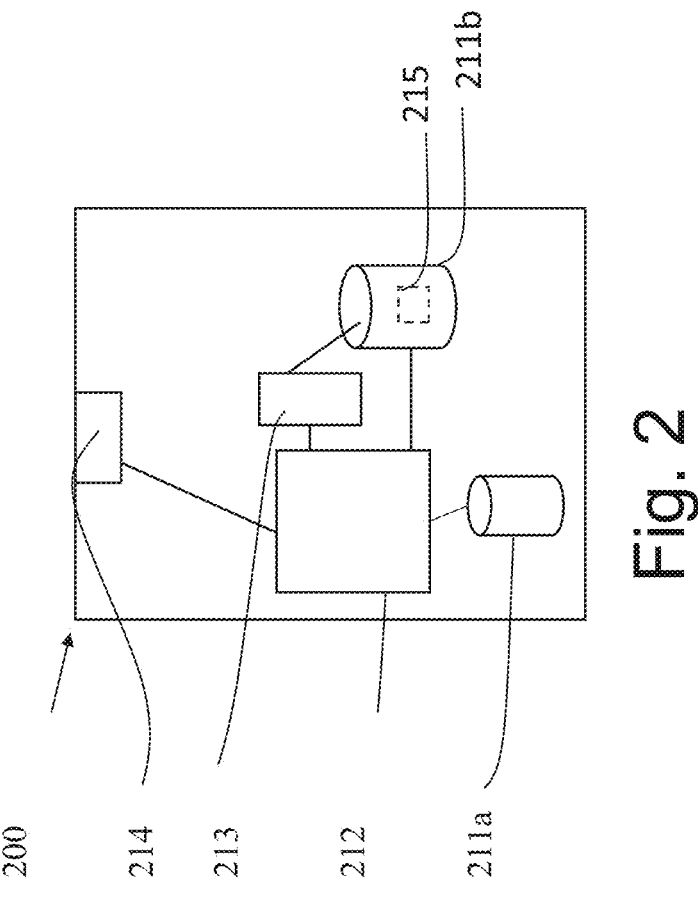
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
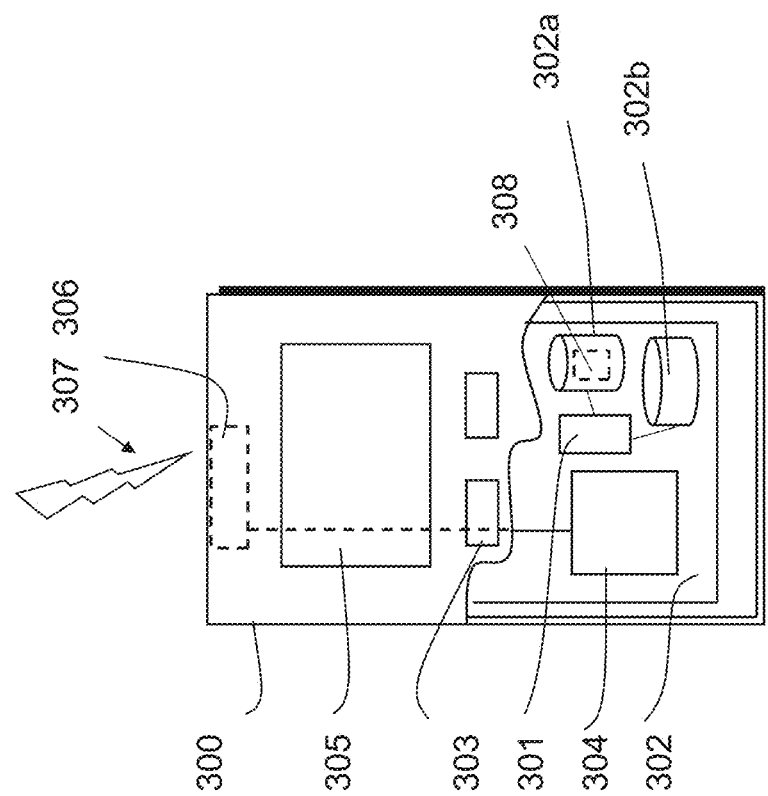
FIG. 3 shows a schematic representation of a user equipment.

FIG. 3 illustrates an example of a UE 300, such as the UE illustrated on FIG. 1. The UE 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspects of this disclosure relate to NR sidelink (SL) communications.

One or more aspects of this disclosure relate to conditions for determining whether to operate a UE to transmit SL synchronization information, for example to support industrial internet of things (IIoT)-like use cases that require high precision synchronization.

SL communications may be organized in frames identified by a direct frame number (DFN). The DFN may enable a UE to synchronize its SL communications according to a SL timing reference. UEs may perform SL synchronization to have the same SL timing reference for SL communications among nearby UEs.

There may be four sources for providing a SL timing reference: a global navigation satellite system (GNSS), a base station (gNB or eNB), a synchronization reference (SyncRef) UE or a UE's own internal clock.

A SyncRef UE may broadcast SL synchronization information to provide a SL timing reference. A SyncRef UE may broadcast the SL synchronization information in a SL synchronization signal block (S-SSB).

A SyncRef UE may be synchronized with a source (i.e. the SyncRef may be provided the SL timing reference originating from the source by the source). A UE may then select the SyncRef UE as a source and the UE may be synchronized with the SyncRef (i.e. the UE may be provided the SL timing reference originating from the source from the SyncRef UE).

The source may have a synchronization coverage (i.e. area within which a UE may be provided the SL timing reference originating from the source by the source). The SyncRef UE may have a synchronization coverage (i.e. area within which a UE may be provided the SL timing reference originating from the source by the SyncRef UE). The SyncRef UE may extend the synchronization coverage of the source (i.e. the area within which a UE may be provided the SL timing reference originating from the source is extended by the SyncRef UE).

The SL synchronization information may comprise a SL primary synchronization signal (S-PSS), a SL secondary synchronization signal (S-SSS) and a physical SL broadcast channel (PSBCH).

The S-PSS and the S-SSS may be jointly referred to as a SL synchronization signal (SLSS). The S-PSS and the S-SSS may be used for time and frequency synchronization. The S-PSS and S-SSS may be selected out of candidate sequences based on an SLSS ID. The SLSS ID may identify a SyncRef UE. The SLSS ID may indicate a priority group of a SyncRef UE. The concept of priority group of a SyncRef UE is discussed further below.

The PSBCH may carry a master information block SL (MIB-SL). The MIB-SL may include a DFN, a slot index and an inCoverage indicator. The inCoverage indicator may period, multiple S-SSBs can be transmitted by the SyncRef UE. The number of S-SSBs transmitted may be (pre-) configured depending on a subcarrier spacing (SCS) and a frequency range. A SyncRef UE may select a slot to transmit S-SSB according to a S-SSB time allocation (sl-SSB-Time-Allocation1 or sl-SSB-TimeAllocation2). The S-SSB time allocation provides a time-offset (sl-TimeOffsetSSB) from the start of a SL SSB period to the first S-SSB, a slot interval (sl-Time Interval) between two neighboring S-SSBs if there are more than one S-SSBs within one S-SSB period and number of S-SSB transmissions (Sl-NumSSB-WithinPe-riod) within each S-SSB period.

An example of a SL-SyncConfig information element is provided below:

```
-- ASN1START
-- TAG-SL-SYNCCONFIG-START
SL-SyncConfigList-r16 ::= SEQUENCE (SIZE (1..maxSL-SyncConfig-r16))
OF SL-SyncConfig-r16
SL-SyncConfig-r16 ::= SEQUENCE {
    ...
    ...
    sl-SSB-TimeAllocation1-r16 SL-SSB-TimeAllocation-r16        OPTIONAL,
-- Need R
    sl-SSB-TimeAllocation2-r16 SL-SSB-TimeAllocation-r16        OPTIONAL,
-- Need R
    sl-SSB-TimeAllocation3-r16 SL-SSB-TimeAllocation-r16        OPTIONAL,
-- Need R
    ...
}
SL-SSB-TimeAllocation-r16 ::= SEQUENCE {
    sl-NumSSB-WithinPeriod-r16   ENUMERATED   {n1, n2, n4, n8, n16, n32,
n64}    OPTIONAL,   -- Need R
    sl-TimeOffsetSSB-r16     INTEGER (0..1279)     OPTIONAL, -- Need R
    sl-TimeInterval-r16     INTEGER (0..639)     OPTIONAL -- Need R
}
-- TAG-SL-SYNCCONFIG-STOP
-- ASN1STOP
``` be a one bit indicator. The inCoverage may indicate whether a SyncRef UE is in coverage of a base station or a GNSS.

An example of a MIB-SL information element is provided below.

```
-- ASN1START
-- TAG-MASTERINFORMATIONBLOCKSIDELINK-START
MasterInformationBlockSidelink ::=   SEQUENCE {
    sl-TDD-Config-r16          BIT STRING (SIZE (12)),
    inCoverage-r16          BOOLEAN,
    directFrameNumber-r16          BIT STRING (SIZE (10)),
    slotIndex-r16          BIT STRING (SIZE (7)),
    reservedBits-r16          BIT STRING (SIZE (2))
}
-- TAG-MASTERINFORMATIONBLOCKSIDELINK-STOP
-- ASN1STOP
``` inCoverage: Value true may indicate that the UE transmitting the MIB-SL is in coverage of a BS or a GNSS (i.e. uses a BS or a GNSS as a source for providing a SL timing reference).

directFrameNumber: May indicate the frame number in which S-SSB transmitted.

slotIndex: May indicate the slot index in which S-SSB transmitted.

SI-TDD-Config: May indicates a time division duplex (TDD) configuration.

S-SSBs may be transmitted by a SyncRef UE with a fixed period of 160 ms (i.e. 16 radio frames). Within each S-SSB sl-NumSSB-WithinPeriod: May indicate the number of sidelink SSB transmissions within one S-SSB period. The applicable values may be related to the subcarrier spacing and frequency as follows:

FR1, SCS=15 kHz: 1

FR1, SCS=30 kHz: 1, 2

FR1, SCS=60 kHz: 1, 2, 4

FR2, SCS=60 kHz: 1, 2, 4, 8, 16, 32

FR2, SCS=120 kHz: 1, 2, 4, 8, 16, 32, 64 sl-TimeOffsetSSB: May indicate the slot offset from the start of S-SSB period to the first S-SSB.

sl-TimeInterval: May indicate the slot interval between neighboring S-SSBs. This value may be applicable when there are more than one sidelink SSBs within one S-SSB period.

TS 38.331, Section 5.8.5.2 read as follows:

"A UE capable of NR sidelink communication and SLSS/ PSBCH transmission shall, when transmitting NR sidelink communication, and if the conditions for NR sidelink communication operation are met and when the following conditions are met:

1> if in coverage on the frequency used for NR sidelink communication, as defined in TS 38.304 [20]; and has selected GNSS or the cell as synchronization reference as defined in 5.8.6.3; or 1> if out of coverage on the frequency used for NR sidelink communication, and the frequency used to transmit NR sidelink communication is included in sl-FreqInfoToAddModList in sl-ConfigDedicat-edNR within RRCReconfiguration message or included in sl-FreqInfoList within SIB12; and has selected GNSS or the cell as synchronization reference as defined in 5.8.6.3:

> 2> if in RRC_CONNECTED; and if networkControlledSyncTx is configured and set to on; or
> 2> if networkControlledSyncTx is not configured; and for the concerned frequency syncTxThreshIC is configured; and the RSRP measurement of the reference cell, selected as defined in 5.8.6.3, for NR sidelink communication transmission is below the value of syncTxThreshIC:
>> 3> transmit sidelink SSB on the frequency used for NR sidelink communication in accordance with 5.8.5.3 and TS 38.211 [16], including the transmission of SLSS as specified in 5.8.5.3 and transmission of MasterInformationBlockSidelink as specified in 5.8.9.4.3;

> 1> else:
>> 2> for the frequency used for NR sidelink communication, if syncTxThreshOoC is included in SidelinkPreconfigNR; and the UE is not directly synchronized to GNSS, and the UE has no selected SyncRef UE or the PSBCH-RSRP measurement result of the selected SyncRef UE is below the value of syncTxThreshOoC; or
>> 2> for the frequency used for NR sidelink communication, if the UE selects GNSS as the synchronization reference source:
>>> 3> transmit sidelink SSB on the frequency used for NR sidelink communication in accordance with TS 38.211 [16], including the transmission of SLSS as specified in 5.8.5.3 and transmission of MasterInformationBlockSidelink as specified in 5.8.9.4.3;"

In other words, TS 38.331 section 5.8.5.2 specifies that a UE may determine to operate as SyncRef UE (i.e. transmits SL synchronization information in a S-SSB) if:

> the UE is explicitly configured by a gNB (e.g. by setting a networkControlledSyncTx IE to true for when the UE is in RRC_CONNECTED;
> a reference signal received power (RSRP) measurement by the UE is above a syncTxThreshIC threshold (if configured) when the UE is in coverage of a gNB; or PSBCH-RSRP measurement by the UE is above syncTx-ThreshOoC (if configured) when out of coverage of a gNB.

Figure 4:
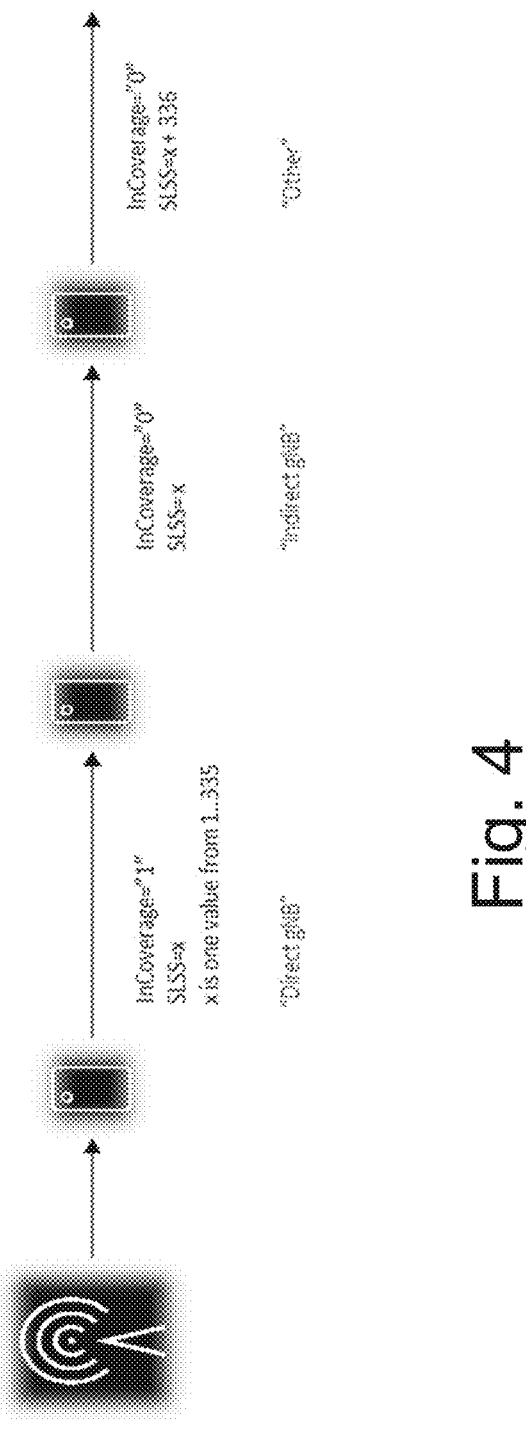
FIG. 4 shows a schematic representation of a sidelink synchronization chain.

FIG. 4 shows a schematic representation of a SL synchronization chain comprising a gNB and three UEs. TS 38.331 section 5.8.5.3 describes a SLSS ID selection at a SyncRef UE within such SL synchronization chain.

A first SyncRef UE may be one hop away from a gNB. The first SyncRef UE may be in coverage of the gNB and a second SyncRef UE may be out of coverage of the gNB and extends the synchronization coverage of the first SyncRef UE (i.e. the first SyncRef UE is selected as a source by the second SyncRef UE), the second SyncRef UE may use the same SLSS ID (e.g. x) than the first SyncRef UE. A S-SSB from the first SyncRef UE may comprise an inCoverage set to true in MIB-SL and a SLSS ID comprised between 1 and 335.

Alternatively, a first SyncRef UE may be two hops away from a gNB. The first SyncRef UE may be out of coverage of the gNB and a second SyncRef UE may be out of coverage of the gNB as well. The second SyncRef UE may use a different SLSS ID (e.g. x+336) than the first SyncRef UE. A S-SSB from the first SyncRef UE may comprise an inCoverage set to false in MIB-SL and a SLSS ID comprised between 1 and 335.

A UE may select a source to provide a SL timing reference selects based on a priority group of the source and whether the synchronization is a GNSS-based synchronization (GNSS is part of the highest priority group) or gNB/eNB-based synchronization (gNB/eNB is part of the highest priority group).

The priority groups may be summarized in the table below. P0 may refer to the highest priority group. P6 may refer to the lowest priority group.

| Priority Group | GNSS-based synchronization | gNB/eNB-based synchronization |
|---|---|---|
| P0 | GNSS | gNB/eNB |
| P1 | UE directly synchronized to GNSS (SyncRef UE in network coverage and directly synchronized to GNSS, i.e., with inCoverage = 1 and SLSS ID = {0}) | UE directly synchronized to gNB/eNB (SyncRef UE directly synchronized to gNB/eNB, i.e., with inCoverage = 1 and with SLSS ID = {1, . . . , 335}) |
| P2 | UE indirectly synchronized to GNSS (SyncRef UE out of GNSS/network coverage and one hop away from GNSS, i.e., with inCoverage = 0 and SLSS ID = {0}) | UE indirectly synchronized to gNB/eNB (SyncRef UE out of GNSS/network coverage and one hop away from a gNB/eNB, i.e., with inCoverage = 0 and with SLSS ID = {1, . . . , 335}) |
| P3 | gNB/eNB | GNSS |
| P4 | UE directly synchronized to gNB/eNB (SyncRef UE directly synchronized to a gNB/eNB, i.e., with inCoverage = 1 and with SLSS ID = {1, . . . , 335}) | UE directly synchronized to GNSS (SyncRef UE directly synchronized to GNSS, i.e., with inCoverage = 1 and SLSS ID = {0}) |
| P5 | UE indirectly synchronized to gNB/eNB (SyncRef UE out of GNSS/network coverage and one hop away from a gNB/eNB, i.e., with inCoverage = 0 and with SLSS ID = {1, . . . , 335}) | UE indirectly synchronized to GNSS (SyncRef UE out of GNSS/network coverage and one hop away from GNSS, i.e., with inCoverage = 0 and SLSS ID = {0}) |
| P6 | the remaining UEs have the lowest priority (including UE's own internal clock; SyncRef UE out of GNSS/network coverage and two or more hops away from a | |

-continued

| Priority Group | GNSS-based synchronization | gNB/eNB-based synchronization |
|---|---|---|
| | gNB/eNB or GNSS, i.e., with inCoverage = 0 and with SLSS ID = {336, 337, . . . , 671}) | |

When a gNB/eNB or a GNSS is available, a UE may select the gNB/eNB or a GNSS to be selected as a source.

When the UE selects the gNB/eNB to be selected as a source, the DFN may be derived from a system frame number (SFN). The SFN provides an indexing of the frames based on a cell timing reference When the UE selects a GNSS to be selected as a source, the DFN, the subframe number within a frame and slot number within a frame used for SL communications may be derived from current coordinated universal time (UTC) provided by the GNSS (see TS 38.331 section. 5.8.12).

When a gNB/eNB or a GNSS is not available, a UE may not select the gNB/eNB or a GNSS to be selected as a source. The UE may performs a full search (i.e. covering all subframes and all possible SL SSIDs) to detect candidate SLSS and therefore to detect candidate SyncRef UEs to be selected as a source.

It may be noted that by detecting the SLSS sent by a SyncRef UE, a UE is able to synchronize to the SyncRef UE and estimate a beginning of a frame and a carrier frequency. Upon successful SLSS detection, a UE may proceed with decoding the PSBCH.

If the UE has not yet selected a SyncRef UE to be selected as a source and multiple candidate SyncRef UEs are detected for which the PSBCH-RSRP exceeds a minimum requirement by sl-SyncRefMinHyst and the corresponding MIB-SL is successfully received, the UE may select the SyncRef UE with the highest PSBCH-RSRP to operate as the source considering the priority groups in the table above.

If the UE has already selected a SyncRef UE to be selected as a source, the UE may reselect a SyncRef UE if:

the PSBCH-RSRP of the strongest candidate SyncRef UE exceeds a minimum requirement by sl-SyncRefMin-Hyst and the strongest candidate SyncRef UE belongs to the same priority group as the already selected SyncRef UE and the PSBCH-RSRP of the strongest candidate SyncRef UE exceeds the PSBCH-RSRP of the already selected SyncRef UE by SyncRefDiffHyst;

the PSBCH-RSRP of the strongest candidate SyncRef UE exceeds a minimum requirement by sl-SyncRefMin-Hyst and the strongest candidate SyncRef UE belongs to a higher priority group than the already selected SyncRef UE; or the PSBCH-RSRP of the already selected SyncRef UE is lower than a minimum requirement.

When a UE selects a SyncRef UE to be selected as a source, the UE uses the SL sync information carried in the S-SSB broadcast by the SyncRef UE to derive a SL timing reference and synchronize with the SyncRef UE.

Accurate time synchronization has been introduced in 3GPP Release-16 with the support of time sensitive networking (TSN) for industrial communication purposes. Release-17 extends the purpose of accurate time synchronization to cover other use cases than IIoT to also be useful for wide-area deployments suitable for power meters, payment terminals, vehicles, etc. With the help of accurate absolute time synchronization, the UE will be able to acquire an accurate time of day (ToD) relative to a global time domain (such as UTC). This can either be used directly as a function for how the device behaves (e.g. robots coordinating their actions or executing at specific time instances) but it can also be used to timestamp events (packets, actions, transactions, etc.) that is then useful to determine a global order of events as is so critical for e.g., bitcoin generations and financial transactions.

In 5GS accurate time synchronization may be enabled by a framework with two aspects:

identifying specific events at the air interface, timestamping these events at the gNB and then the UE identifying these events and receiving the timestamp relative to these events from the gNB to acquire a ToD; and mechanisms for the propagation delay compensation (PDC) (introduced in Release-17).

The air interface events timestamped by the gNB may be the ending boundary of a reference SFN. The timestamp may be carried in a ReferenceTimeInfo-r16 IE (RTI) that can be transmitted in a SIB9 (ideal for broadcasting) or RTI can be delivered via dedicated RRC signalling as a part of DLInformationTransfer. In the case of RRC carried RTI, the reference SFN that the timestamp refers to may be explicitly given (can be back or forth in time). In the case of SIB9 carried, the reference SFN may be implicitly given by the SFN in which the ongoing system information window (SI-window) ends (see TS 38.331).

Let us consider a scenario (e.g. tunnel, underground, parking lot, indoor, dense forest) where there is no gNB/eNB or GNSS available to be selected as a source and one or more IIoT-like UE(s) are in the need of SL synchronization. In this scenario, a UE may perform SL synchronization by synchronizing with a SyncRef UE.

In case there is no gNB/eNB or GNSS available to be selected as a source, a UE may operate as a SyncRef UE by extending the synchronization coverage of another SyncRef UE (which may be in coverage with the gNB/eNB or out of coverage with the gNB/eNB). In this way, the UE may be selected as a source and may provide a SL timing reference to UEs in the vicinity.

In this disclosure, the synchronization coverage extension of a source via series of SyncRef UEs (where one SyncRef UE extends the synchronization coverage of another SynRef UE) is referred as a sync chain as illustrated 4.

TS38.331 section. 5.8.5 specifies that a UE may determine to operate as a SyncRef UE (i.e., transmits SL synchronization information in a S-SSB) and extend the synchronization coverage of another SyncRef UE (i.e. be part of a synchronization chain), if the other SyncRef UE is in coverage of a gNB/eNB, the UE is out of coverage of the gNB/eNB and the PSBCH-RSRP from the other SyncRef UE is below a threshold (syncTxThreshOoC).

SyncRef UEs may have different synchronization accuracies (including clock's stability, variance and/or drift) depending for example on implementation error of the SyncRef UEs, synchronization accuracies at the source of the SyncRef UEs, etc. Hence, any error introduced by the SyncRef UEs will be carried further down in the synchronization chain, and the synchronization inaccuracy may compound along the synchronization chain leading to highly inaccurate and unstable SL timing reference. Such synchronization inaccuracy and instability of the SL timing reference may be unacceptable for IIoT UEs. It may affect the frame boundary timing and hence degrading the understanding of accurate ToD by IIoT UEs.

Figure 5:
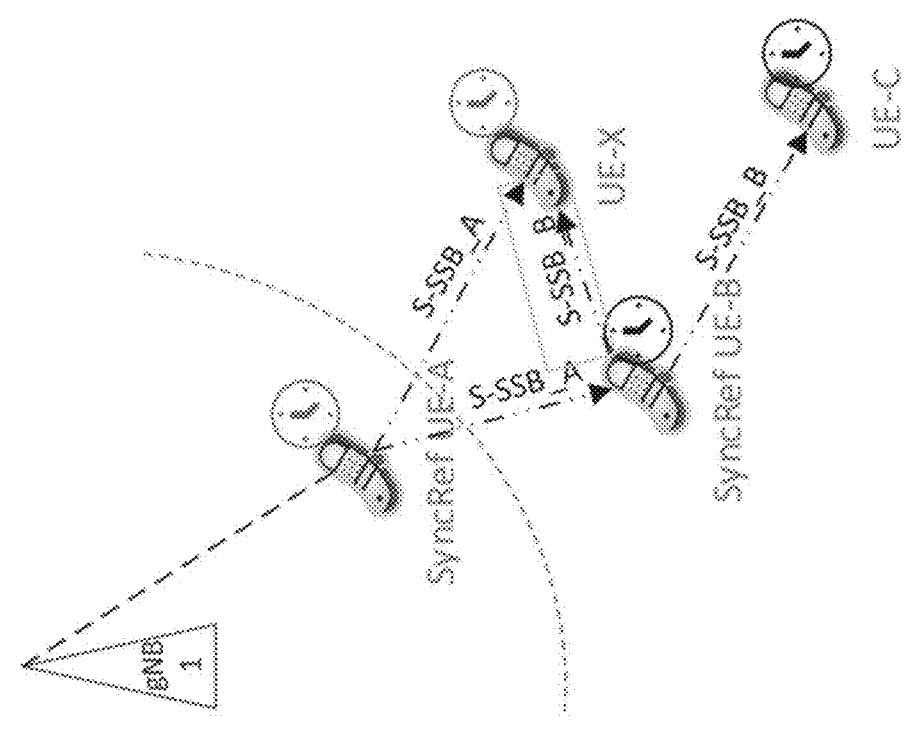
FIG. 5 shows a schematic representation of another sidelink synchronization chain.

FIG. 5 shows a schematic representation of a SL synchronization chain. A SyncRef UE-B extends the synchronization coverage of a SyncRef UE-A. UE-C may be synchronized with SyncRef UE-B. That is, SyncRef UE-B is selected as a source by UE-C.

If SyncRef UE-B is unstable and introduces significant synchronization error, UE-C will inherit the synchronization error as it is synchronized with SyncRef UE-B which may not be acceptable for IIoT-like use cases. UE-X (which is considered to be stable and accurate) may receive a S-SSB from both SyncRef UE-A and SyncRef UE-B and may select SyncRef UE-A to be selected as a source for UE-X (considering the priority group of SyncRef UE-A and SyncRef UE-B and existing standard procedure). When the PSBCH-RSRP from SyncRef UE-B is above syncTxThreshOoC, UE-X may not operate as SyncRef UE and hence UE-C may not select UE-X to be selected as a source for UE-C.

TS38.331 section. 5.8.5 does not contemplate that SyncRef UEs may have different synchronization accuracies, let alone that the UE should determine whether to operate as a SyncRef UE based on these synchronization accuracies.

One or more aspects of this disclosure relate to configuring a UE to operate as a SyncRef UE and extend the synchronization coverage of a first SyncRef UE when a second SyncRef UE that is already extending the synchronization coverage of the first SyncRef UE increases synchronization inaccuracy and instability of the SL timing reference.

Figure 6:
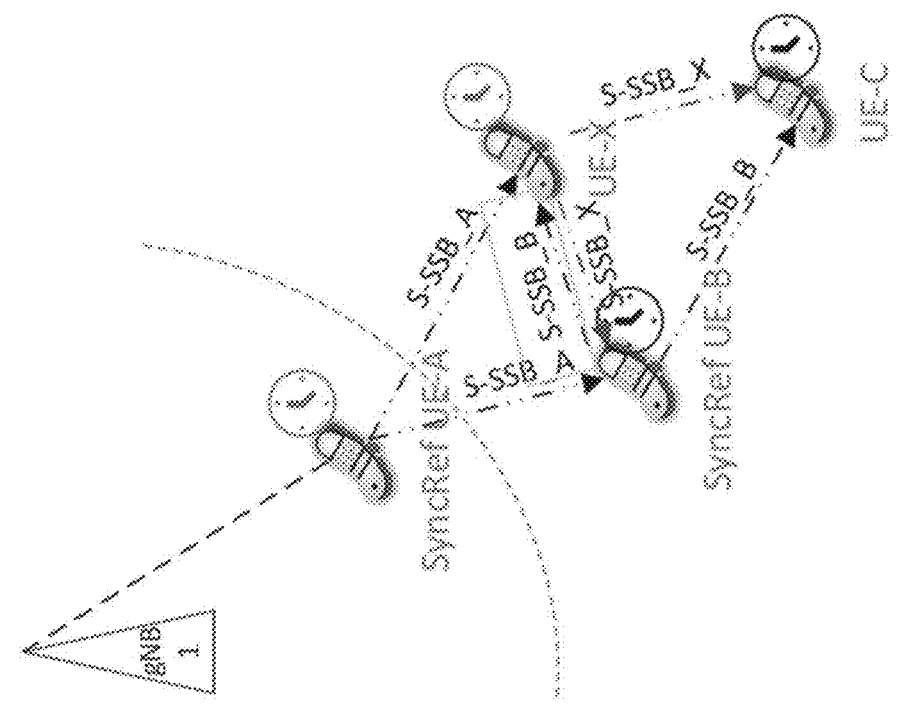
FIG. 6 shows a schematic representation of another sidelink synchronization chain.

FIG. 6 shows a schematic representation of another sidelink synchronization chain. A method is described to determine whether to operate a UE-X as a SyncRef UE.

In step 1, the UE-X may monitor a SL synchronization resource pool in a S-SSB period to receive S-SSBs from SyncRef UEs (e.g. following Rel.16 legacy procedures).

In step 2, the UE-X may determine that the UE-X is the synchronization coverage of at least two SyncRef UEs. The UE-X may determine that a second SyncRef UE-B extends the synchronization coverage of a first SyncRef UE-A.

The UE-X may determine that the second SyncRef UE-B extends the synchronization coverage of the first SyncRef UE-A based on the SLSS ID and inCoverage indicator indicated in the S-SSBs received from the first SyncRef UE-A and the second SyncRef UE-B.

As described above, SLSS ID selection at a SyncRef UE is described in TS 38.331 Section 5.8.5.3.

The first SyncRef UE-A may be one hop away from a gNB. The first SyncRef UE-A may be in coverage of the gNB and the second SyncRef UE-B may be out of coverage of the gNB and extends the synchronization coverage of the first SyncRef UE-A (i.e. the first SyncRef UE is selected as a source for the second SyncRef UE-B), the second SyncRef UE-B may use the same SLSS ID (e.g. x) than the first SyncRef UE-A. A S-SSB from the first SyncRef UE-A may comprise an inCoverage set to true in MIB-SL and a SLSS ID comprised between 1 and 335.

Alternatively, the first SyncRef UE-B may be two hops away from a gNB. The first SyncRef UE-B may be out of coverage of the gNB and the second SyncRef UE-C may be out of coverage of the gNB as well. The second SyncRef UE-C may use a different SLSS ID (e.g. x+336) than the first SyncRef UE-B. A S-SSB from the first SyncRef UE may comprise an inCoverage set to false in MIB-SL and a SLSS ID comprised between 1 and 335.

In step 3, the UE-X may determine a first synchronization error between the first SyncRef UE-A and the second SyncRef UE-B and a second sync error between the first SyncRef UE-A source and the UE-X. The first synchronization error may be due to the second SyncRef UE-B. The second synchronization error may be due to the UE-X The UE-X may determine the first synchronization error based on the S-SSBs received from the first SyncRef UE-A and the second SyncRef UE-B. The UE-X may compare the S-SSBs received from the first SyncRef UE-A and the second SyncRef UE-B. The UE-X may evaluate how stable the timing of the S-SSBs received from the first SyncRef UE-A is compared to the timing of the S-SSBs received from the first SyncRef UE-B. The UE-X may determine a synchronization misalignment between the first SyncRef UE-A and the second SyncRef UE-B. In an example, the UE-X may identify the misalignment in DFN boundaries indicated by the S-SSBs received from the SyncRef UE-A and the SyncRef UE-B as the first synchronization error.

The UE-X may determine the second synchronization error based on the S-SSB received from the first SyncRef UE-A and/or the UE-X's own level of accuracy. In an example, the UE-X may already be aware of (e.g. based on UE capability or hardware limitations) the synchronization error it may introduce while extending the synchronization coverage of a SyncRef source. Then, this synchronization error may be considered as the second synchronization error by the UE-X.

In step 4, the UE-X may determine whether to operate as a SyncRef UE (i.e. transmit SL synchronization information in a S-SSB) and extend the synchronization coverage of the first SyncRef UE-A based on the first synchronization error and the second synchronization error.

If the second synchronization error is less than the first synchronization error by a threshold, the UE-X may operate as a SyncRef UE (i.e. transmit SL synchronization information in a S-SSB) and extend the synchronization coverage of the first SyncRef UE-A.

If the second synchronization error is less than the first synchronization error by a threshold, an additional condition may be used to determine whether to extend the synchronization coverage of the first SyncRef UE-A.

In a first alternative, if the PSBCH-RSRP for SyncRef UE-B is lower than a first synchronization error dependent PSBCH-RSRP-threshold (regardless the second synchronization error), the UE-X may operate as a SyncRef UE and may extend the synchronization coverage of the SyncRef UE-A. For example, the higher the first synchronization error, the lower is the PSBCH-RSRP-threshold.

In a second alternative, if the PSBCH-RSRP for SyncRef UE-B is lower than an error-difference-dependent PSBCH-RSRP-threshold (wherein the error difference corresponds to the difference between the first synchronization error and the second synchronization error), the UE-X may operate as a SyncRef UE and may extend the synchronization coverage of the SyncRef UE-A. For example, the higher the error difference, the lower is the PSBCH-RSRP-threshold.

If the second synchronization error is greater than the first synchronization error by a threshold, the UE-X may not operate as a SyncRef UE (i.e. transmit SL synchronization information in a S-SSB) and may not extend the synchronization coverage of the first SyncRef UE-A. In the event the UE-X was already operating as a SyncRef UE (i.e. transmit SL synchronization information in a S-SSB) and extending the synchronization coverage of the first SyncRef UE-A, the UE-X may stop operating as a SyncRef UE (i.e. transmit SL synchronization information in a S-SSB) and may stop extending the synchronization coverage of the first SyncRef UE-A.

In step 5, assuming that the UE-X determines to operate as a SyncRef UE (i.e. transmit SL synchronization information in a S-SSB) and extend the synchronization coverage of the first SyncRef UE-A, the UE-X may determine SL synchronization information and transmission parameters of a S-SSB.

The UE-X may change the inCoverage indicator and/or SLSS ID to be part of a higher or lower priority group and therefore to increase or decrease the probability of being selected as a source by a neighbouring UE. It is noted, as described above, that the priority group of a SyncRef UE may be determined using the inCoverage indicator and/or SLSS ID. For example, a SyncRef UE with an inCoverage indicator set to 1 is considered to be part of a higher priority group than a SyncRef UE with an inCoverage indicator set to 0, and vice versa. In case the UE-X determines to operate as a SyncRef UE (i.e. transmit SL synchronization information in a S-SSB) and extend the synchronization coverage of the first SyncRef UE-A, it may set the inCoverage indicator from 0 to 1 briefly so that the UE-X is more likely to be selected as a source by a neighboring UE for providing a SL time reference.

Alternatively, the UE-X may increase or decrease a transmission power of the UE-X in order to more or less likely to be selected as a source by neighboring UE for providing a SL time reference.

In step 6, the UE may operate as a SyncRef UE (i.e. transmit SL synchronization information in a S-SSB) and extend the synchronization coverage of the first SyncRef UE-A.

The SL synchronization information may comprise a cause indicator (e.g. one bit) indicating a cause for operating as a SyncRef UE (i.e. transmit SL synchronization information in a S-SSB) and extending the synchronization coverage of the first SyncRef UE-A. The cause may be that the UE-X provides a reduced synchronization error compared to the second SyncRef UE-B (i.e. the second synchronization error is lower than the first synchronization error by a threshold).

The cause indicator may be useful in that a neighboring UE may preferably select the UE-X as a source to provide a SL timing reference because the cause indicator implicitly or explicitly indicates a higher synchronization accuracy and stability than the second SyncRef UE-B.

The SL synchronization information may comprise an availability indicator (e.g. one bit) indicating an availability of the second SyncRef UE-B extending the synchronization coverage of the first SyncRef UE-A.

The UE-X may establish sidelink relay connection with the UE-C and provide RTI via SIB9 forwarding. The UE-C may preferably select the UE-X as a source to provide a SL timing reference.

In the above method the UE-X determines to operate as a SyncRef UE (i.e. transmit SL synchronization information in a S-SSB) and extend the synchronization coverage of the first SyncRef UE-A when the second SyncRef UE-B is observed to be increasing a synchronization inaccuracy compared to the UE-X. The above method is particularly beneficial when the first SyncRef UE-A is in coverage of the gNB or in case the SL synchronization chain up to three hops when the first SyncRef UE-A is in coverage of the gNB.

Figure 7:
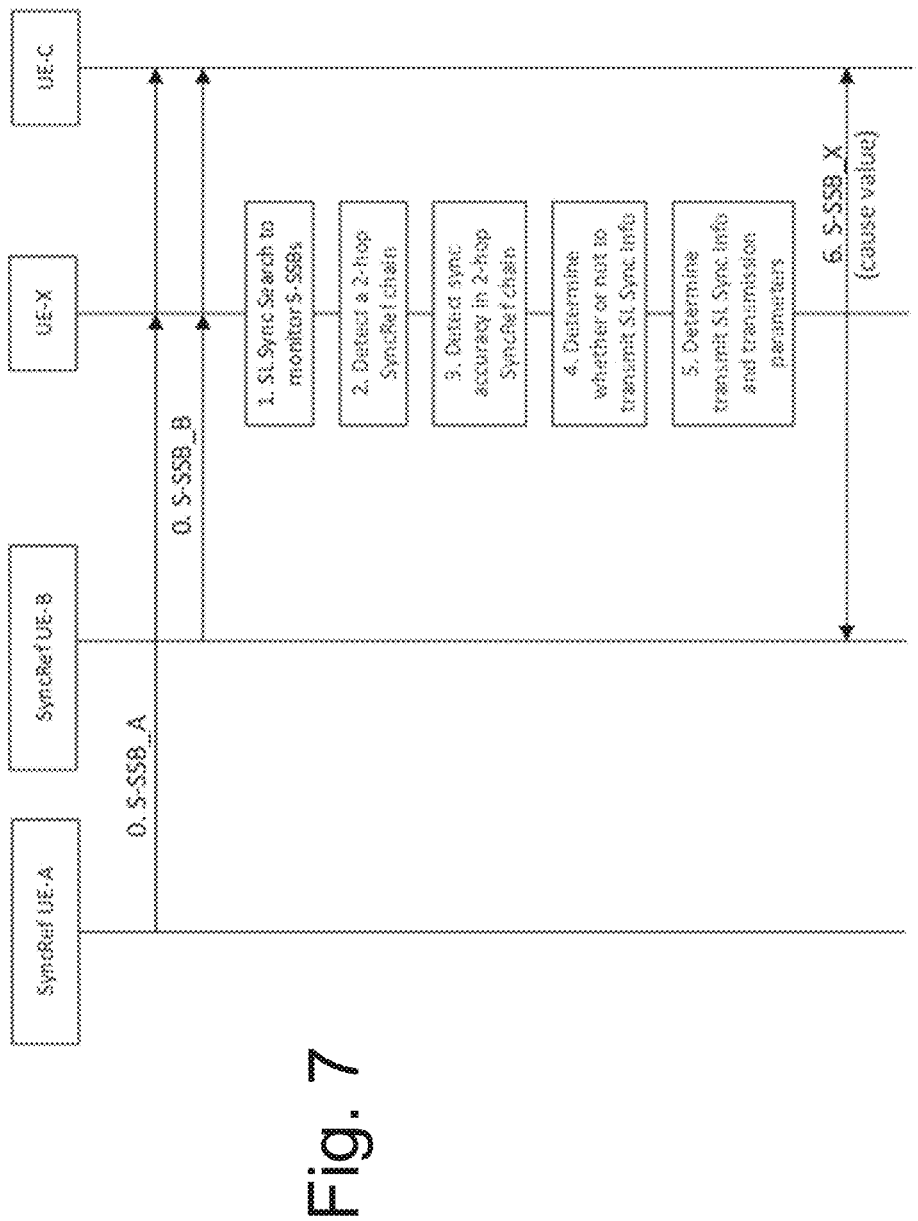
FIG. 7 shows a signaling diagram of a process for determining whether to operate as a sidelink synchronization reference user equipment in a communication system.

FIG. 7 shows a signaling diagram of a process for determining whether to operate a UE-X (S-SSB_X on FIG. 7) as a SL synchronization reference UE.

In step 0, the SyncRef UE-A may transmit a S-SSB A (S-SSB_A on FIG. 7) with a SLSS ID set to x and an inCoverage indicator set to 1. The second SyncRef UE-B (S-SSB_B on FIG. 7) may be synchronized with the first SyncRef UE-A and may extend the synchronization coverage of the first SyncRef UE-A. The second SyncRef UE-B may transmit a S-SSB B with a SLSS ID set to x and an inCoverage indicator set to 0.

In step 1, the UE-X may receive the S-SSB A and the S-SSB B transmitted by the first SyncRef UE-A and the second SyncRef UE-B (e.g. as per the Release-16 legacy procedure). The UE-X may perform a SL synchronization search during each S-SSB period when there is no gNB/eNB or GNSS available to be selected as a source for providing a SL timing reference.

In step 2, the UE-X may determine that the UE-X is in synchronization coverage of the first SyncRef UE-A and the second SyncRef UE-B. The UE-X may determine that the second SyncRef UE-B extends the synchronization coverage of first SyncRef UE-A. The UE-X may determine that the same SLSS ID (i.e. 'x') is used by the first SyncRef UE-A and the second SyncRef UE-B and a change in inCoverage indicator (from 1 to 0).

In step 3, the UE-X may determine a first synchronization error between the first SyncRef UE-A and the second SyncRef UE-B and a second synchronization error between the first SyncRef UE-A and the UE-X.

In step 4, the UE-X may determine whether to operate as a SyncRef UE (i.e. transmit SL synchronization information in a S-SSB X) and extend the synchronization coverage of the SyncRef UE-A.

For example, if the second synchronization error is lower than the first synchronization error by a threshold, the UE may operate as a SL synchronization reference UE (i.e. transmit SL synchronization information in a S-SSB X) and may extend the synchronization coverage of the SyncRef UE-A.

In step 5, assuming that the UE-X determines to operate as a SyncRef UE (i.e. transmit SL synchronization information in a S-SSB X) and extend the synchronization coverage of the SyncRef UE-A, the UE-X may determine SL synchronization information and transmission parameters of a S-SSB.

In step 6, the UE-X may operate as a SyncRef UE (i.e. transmit SL synchronization information in a S-SSB X) and extend the synchronization coverage of the SyncRef UE-A. The SL synchronization information may comprise a cause indicator (e.g. one bit) indicating a cause for operating as a SyncRef UE (i.e. transmit SL synchronization information in a S-SSB) and extending the synchronization coverage of the first SyncRef UE-A.

Figure 8:
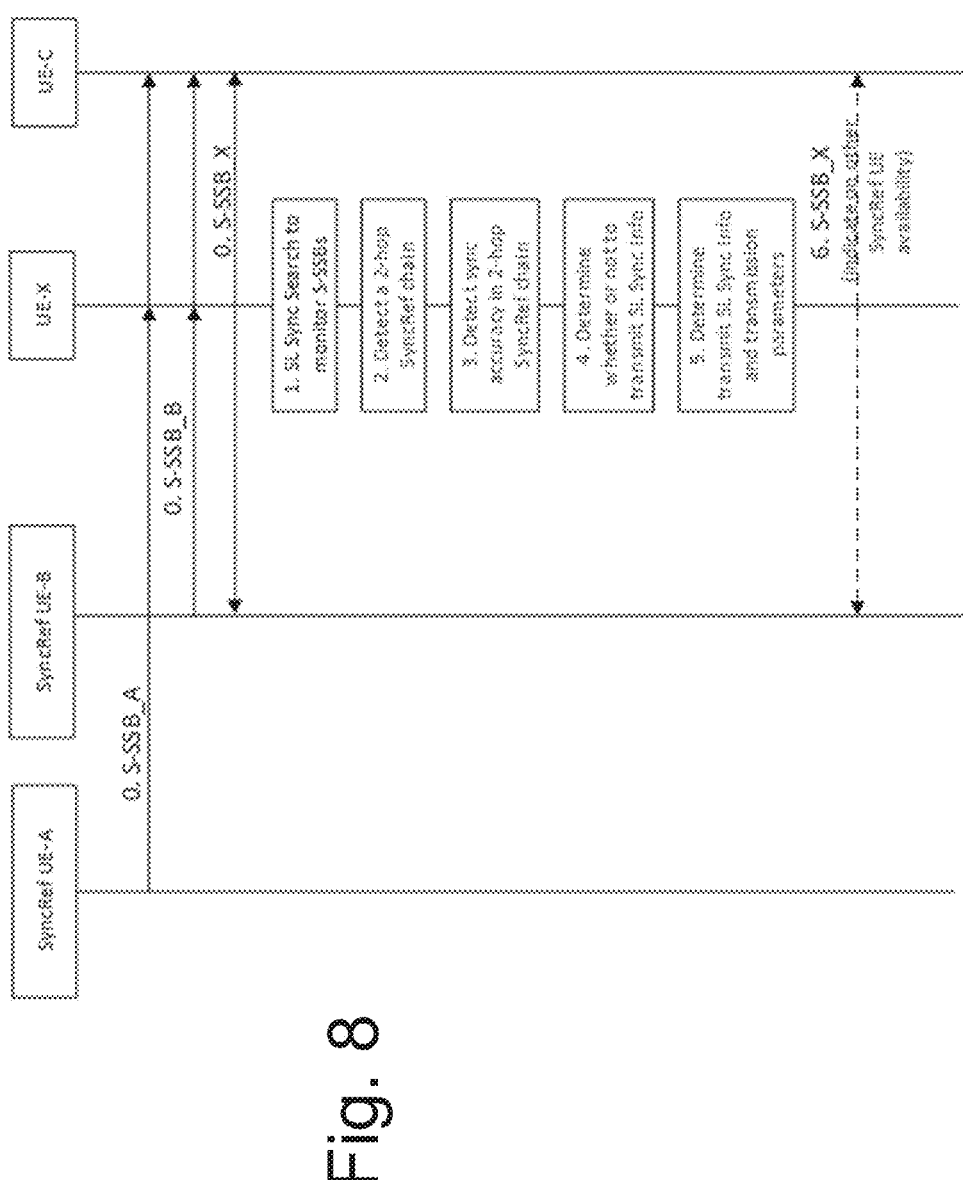
FIG. 8 shows a signaling diagram of another process for determining whether to operate as a sidelink synchronization reference user equipment in a communication system.

FIG. 8 shows a signaling diagram of another process for determining whether to operate a UE-X as a SL synchronization reference UE. Unlike the method of FIG. 7, the SyncRef UE-X may already operate as a SL synchronization reference UE (i.e. transmit SL synchronization information in a S-SSB) and may extend the synchronization coverage of the SyncRef UE-A.

In step 0, the SyncRef UE-A may transmit a S-SSB A with a SLSS ID set to x and an inCoverage indicator set to 1. The second SyncRef UE-B may be synchronized with the first SyncRef UE-A and may extend the synchronization coverage of the first SyncRef UE-A. The second SyncRef UE-B may transmit a S-SSB B with a SLSS ID set to x and an inCoverage indicator set to 0. The SyncRef UE-X may also be synchronized with the first SyncRef UE-A and may extend the synchronization coverage of the first SyncRef UE-A. The SyncRef UE-X may transmit a S-SSB X with a SLSS ID set to x and an inCoverage indicator set to 0.

In step 1, the UE-X may receive the S-SSB A and the S-SSB B transmitted by the first SyncRef UE-A and the second SyncRef UE-B (e.g. as per the Release-16 legacy procedure). The UE-X may perform a SL synchronization search during each S-SSB period when there is no gNB/eNB or GNSS available to be selected as a source for providing a SL timing reference.

In step 2, the UE-X may determine that the UE-X is in synchronization coverage of the first SyncRef UE-A and the second SyncRef UE-B. The UE-X may determine that the second SyncRef UE-B extends the synchronization coverage of first SyncRef UE-A. The UE-X may determine that the same SLSS ID (i.e. 'x') is used by the first SyncRef UE-A and the second SyncRef UE-B and a change in inCoverage indicator (from 1 to 0).

In step 3, the UE-X may determine a first synchronization error between the first SyncRef UE-A and the second SyncRef UE-B and a second synchronization error between the first SyncRef UE-A and the UE-X.

In step 4, the UE-X may determine whether to operate as a SyncRef UE (i.e. transmit SL synchronization information in a S-SSB X) and extend the synchronization coverage of the SyncRef UE-A.

For example, if the second synchronization error is greater than the first synchronization error by a threshold, the UE may stop operating as a SL synchronization reference UE (i.e. transmitting SL synchronization information in a S-SSB X) and may stop extending the synchronization coverage of the SyncRef UE-A.

Alternatively, the second synchronization error is greater than the first synchronization error by a threshold, the UE may continue operating as a SL synchronization reference UE (i.e. transmitting SL synchronization information in a S-SSB X) and may continue extending the synchronization coverage of the SyncRef UE-A.

In step 5, assuming that the UE-X determines to continue operating as a SyncRef UE (i.e. transmit SL synchronization information in a S-SSB X) and extending the synchronization coverage of the SyncRef UE-A, the UE-X may determine SL synchronization information and transmission parameters of a S-SSB. The UE-X may adjust the SL synchronization information and/or a transmission parameter of a S-SSB to reduce the probability of being selected as a source by a neighboring UE.

In step 6, the UE-X may continue operating as a SyncRef UE (i.e. transmit SL synchronization information in a S-SSB X) and extending the synchronization coverage of the SyncRef UE-A. The SL synchronization information may comprise an availability cause indicator (e.g. one bit) indicating the availability of the second SyncRef UE-B that is extending the synchronization coverage of the first SyncRef UE-A.

Figure 9:
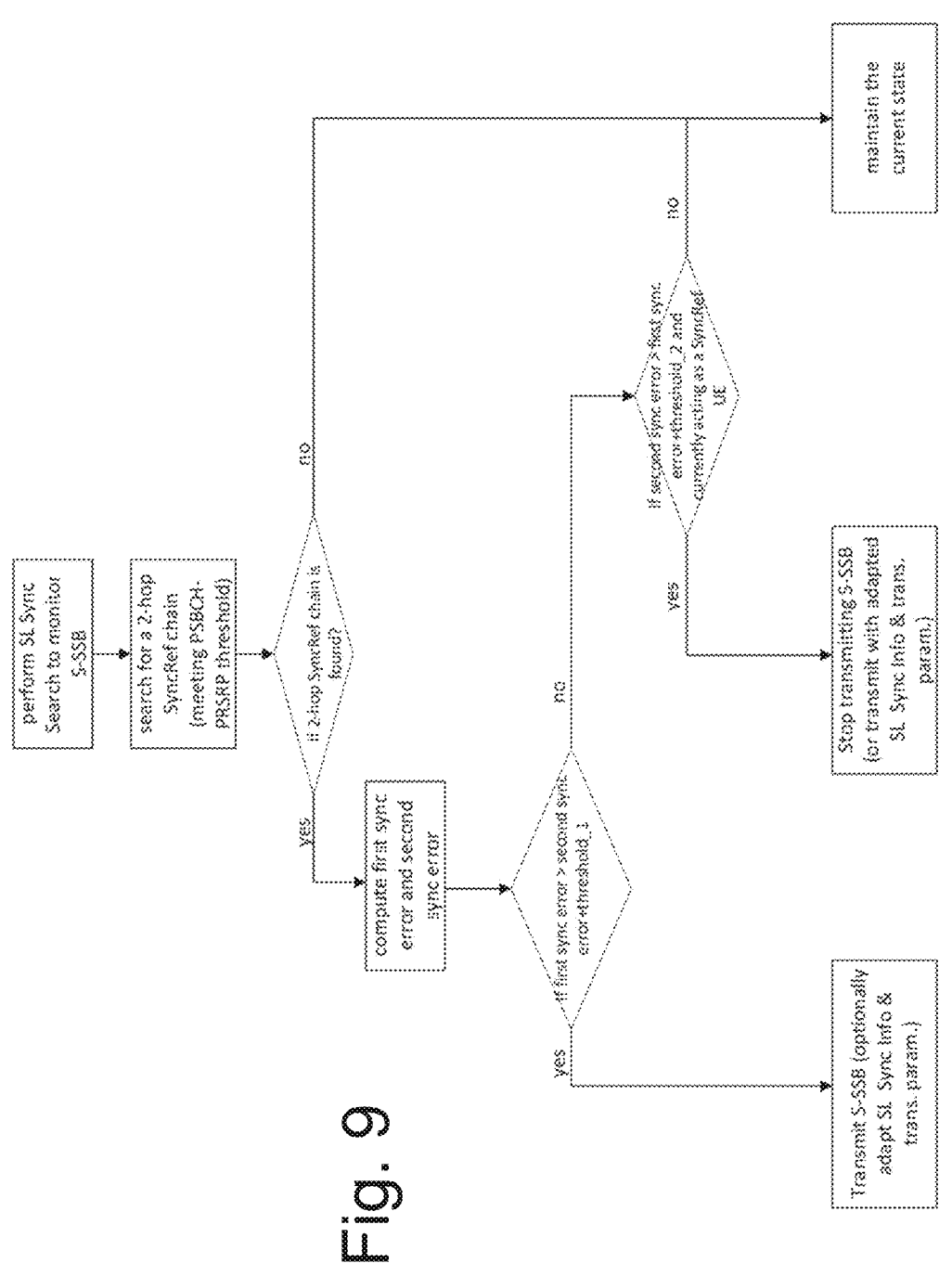
FIG. 9 shows a flow chart of a process for determining whether to operate as a sidelink synchronization reference user equipment in a communication system as per FIGS. 7 and 8.

FIG. 9 shows a flow chart of a process for determining whether to operate as a SL SyncRef UE in a communication system as per FIGS. 7 and 8.

One or more aspects of this disclosure enable accurate and stable UE to operate as a SyncRef UE and extend the synchronization coverage of a first SyncRef UE when a second SyncRef UE in the vicinity is already extending the synchronization coverage of a first SyncRef UE but is introducing synchronization inaccuracy and instability. This prevents synchronization inaccuracy and instability being carried down in a synchronization chain and avoids compounding of synchronization inaccuracies and instabilities along the synchronization chain. This allows to cater IIoT devices which demand very higher synchronization accuracy and stability.

FIG. 10 shows a block diagram of a method for determining whether to operate as a SL SyncRef UE in a communication system. The method may be performed by an apparatus (e.g. UE-X).

In step 1000, the apparatus may determine that a second SL SyncRef UE (e.g. SL SyncRef UE-B) extends synchronization coverage of a first SL SyncRef UE (e.g. SL SyncRef UE-A).

In step 1002, the apparatus may determine a first synchronization error between the first SL SyncRef UE and the second SL SyncRef UE and a second synchronization error between the first SL SyncRef UE and the apparatus.

In step 1004, the apparatus may determine whether to operate the apparatus as a SL SyncRef UE and extend the synchronization coverage of the first SL SyncRef UE based on the first synchronization error and the second synchronization error.

Alternatively, in step 1004, the apparatus may report the first synchronization error and the second synchronization error to another apparatus to allow the other apparatus to determine whether to operate the apparatus as a SL SyncRef UE and extend the synchronization coverage of the first SL SyncRef UE based on the first synchronization error and the second synchronization error. The other apparatus may be a UE, a road side unit, a base station or other. The apparatus may receive an indication from the other apparatus to operate the apparatus as a SL SyncRef UE and extend the synchronization coverage of the first SL SyncRef UE. The apparatus may determine to operate the apparatus as a SL SyncRef UE and extend the synchronization coverage of the first SL SyncRef UE based on the indication.

The first sidelink SL SyncRef UE may be in coverage or out of coverage of a BS or a GNSS.

Determining that the second SL SyncRef UE extends the synchronization coverage of the first SL SyncRef UE may be based on at least one of: a first sidelink synchronization identifier transmitted by the first SL SyncRef UE; a second sidelink synchronization identifier transmitted by the second SL SyncRef UE; a first in coverage indicator indicating whether the first SL SyncRef UE is in coverage of a BS or a GNSS; or a second in coverage indicator indicating whether the second SL SyncRef UE is in coverage of a BS or a GNSS.

Determining that the second SL SyncRef UE extends the synchronization coverage of the first SL SyncRef UE may comprise: determining that the second sidelink synchronization identifier of the second SL SyncRef UE is the same as the first sidelink synchronization identifier of the first SL SyncRef UE; determining that the first in coverage indicator of the first SL SyncRef UE indicates that the first SL SyncRef UE is in coverage of a base station or a global navigation synchronization system; and determining that the second in coverage indicator of the second SL SyncRef UE indicates that the second SL SyncRef UE is out of coverage of a BS or a GNSS.

Determining that the second SL SyncRef UE extends the synchronization coverage of the first SL SyncRef UE may comprise: determining that the second sidelink synchronization identifier of the second SL SyncRef UE is equal to the first sidelink synchronization identifier of the first SL SyncRef UE plus a known value; determining that the first in coverage indicator of the first SL SyncRef UE indicates that the first SL SyncRef UE is out of coverage of a base station or a global navigation synchronization system; and determining that the second in coverage indicator of the second SL SyncRef UE indicates that the second SL SyncRef UE is out of coverage of a BS or a GNSS.

Determining the first synchronization error between the first SL SyncRef UE and the second SL SyncRef UE may comprise: receiving a first SLSS in a first S-SSB from the first SL SyncRef UE; receiving a second SLSS in a second S-SSB from the second SL SyncRef UE; and determining the first synchronization error based on the first SLSS and the second SLSS.

Determining the second synchronization error between the first SL SyncRef UE and the apparatus may be based on a first SLSS and/or a level of synchronization accuracy of the apparatus.

Determining whether to operate the apparatus as a SL SyncRef UE and extend the synchronization coverage of the first SL SyncRef UE based on the first synchronization error and the second synchronization error may comprise:

determining that the second synchronization error is greater than the first synchronization error by a threshold; and determining to not operate the apparatus as a SL SyncRef UE and not extend the synchronization coverage of the first SL SyncRef UE.

Determining to not operate the apparatus as a SL SyncRef UE and not extend the synchronization coverage of the first s SL SyncRef UE may comprise: determining to stop operating the apparatus as a SL SyncRef UE and to stop extending the synchronization coverage of the first SL SyncRef UE.

Determining whether to operate the apparatus as a SL SyncRef UE and extend the synchronization coverage of the first SL SyncRef UE based on the first synchronization error and the second synchronization error may comprise: determining that the second synchronization error is greater than the first synchronization error by a threshold; and determining to operate the apparatus as a SL SyncRef UE and extend the synchronization coverage of the first SL SyncRef UE.

Determining whether to operate the apparatus as a SL SyncRef UE and extend the synchronization coverage of the first SL SyncRef UE based on the first synchronization error and the second synchronization error may comprise: determining that the second synchronization error is lower than the first synchronization error by a threshold; and determine to operate the apparatus as a SL SyncRef UE and extend the synchronization coverage of the first SL SyncRef UE.

Determining whether to operate the apparatus as a SL SyncRef UE and extend the synchronization coverage of the first SL SyncRef UE based on the first synchronization error and the second synchronization error may further comprise: determining that a signal for the second SL SyncRef UE is lower than a signal threshold, wherein the signal threshold is dependent on the first synchronization error or on a difference between the first synchronization error and the second synchronization error; and determine to operate the apparatus as a SL SyncRef UE and extend the synchronization coverage of the first SL SyncRef UE.

The apparatus may adjusting at least one sidelink synchronization information or transmission parameter of a S-SSB to increase or reduce the probability of being selected as a synchronization source by a neighboring user equipment.

The sidelink synchronization information may comprise an in coverage indicator a or a SLSS ID.

The transmission parameter may comprise a transmission power.

Adjusting at least one sidelink synchronization information or transmission parameter to increase or reduce the probability of being selected as a synchronization source by a neighboring user equipment may comprise: changing an in coverage indicator to indicate that the apparatus is in coverage of a BS or a GNSS to increase the probability of being selected as a synchronization source by a neighboring user equipment; changing an in coverage indicator to indicate that the apparatus is out of coverage of a BS or a GNSS to reduce the probability of being selected as a synchronization source by a neighboring user equipment; increasing a transmission power to increase the probability of being selected as a synchronization source by a neighboring user equipment; or reducing a transmission power to reduce the probability of being selected as a synchronization source by a neighboring user equipment.

Operating the apparatus as SyncRef UE may comprise: transmitting sidelink synchronization information in a S-SSB.

The sidelink synchronization information may comprise at least one of a SLSS or PSBCH.

The SLSS may comprise at least one of a S-PSS or a S-SSS.

Extending the synchronization coverage of the first SyncRef UE may comprise: selecting the first SyncRef UE as a synchronization source to provide a sidelink timing reference.

Operating the apparatus as SyncRef UE may comprise: transmitting a cause indicator indicating a cause for operating the apparatus as SyncRef UE; and/or transmitting an availability indicator indicating the availability of the second SyncRef UE extending the synchronization coverage of the first SyncRef UE.

The cause may comprise that the apparatus provides a reduced synchronization error compared to the second SyncRef UE (i.e the second synchronization error is lower than the first synchronization error by a threshold).

Figure 11:
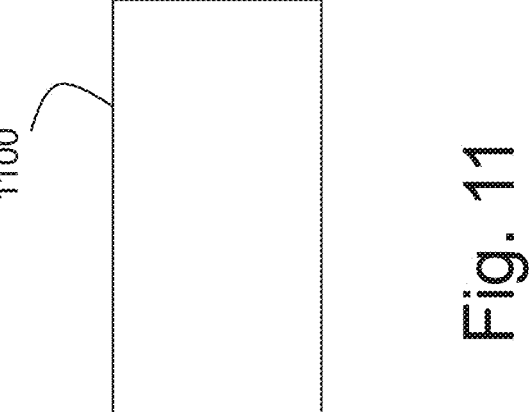
FIG. 11 shows a schematic representation of a non-volatile memory medium storing instructions which when executed by a processor allow a processor to perform one or more of the steps of the method of FIG. 10.

FIG. 11 shows a schematic representation of non-volatile memory media 1100 storing instructions and/or parameters which when executed by a processor allow the processor to perform one or more of the steps of the method of FIG. 10.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG.

10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:

at least one processor; and at least one memory storing instructions that, when executed by the at least one processor, cause the apparatus at least to:

determine that a second sidelink synchronization reference user equipment extends synchronization coverage of a first sidelink synchronization reference user equipment;

determine a first synchronization error between the first sidelink synchronization reference user equipment and the second sidelink synchronization reference user equipment and a second synchronization error between the first sidelink synchronization reference user equipment and the apparatus; and determine whether to operate the apparatus as a sidelink synchronization reference user equipment and extend the synchronization coverage of the first sidelink synchronization reference user equipment based on the first synchronization error and the second synchronization error or report the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

2. The apparatus of claim 1, wherein determining that the second sidelink synchronization reference user equipment extends the synchronization coverage of the first sidelink synchronization reference user equipment is based on at least one of:

a first sidelink synchronization identifier transmitted by the first sidelink synchronization reference user equipment;

a second sidelink synchronization identifier transmitted by the second sidelink synchronization reference user equipment;

a first in coverage indicator indicating whether the first sidelink synchronization reference user equipment is in coverage of a base station or a global navigation synchronization system; or a second in coverage indicator indicating whether the second sidelink synchronization reference user equipment is in coverage of a base station or a global navigation synchronization system.

3. The apparatus of claim 1, wherein determining the first synchronization error between the first sidelink synchronization reference user equipment and the second sidelink synchronization reference user equipment comprises:

receiving a first sidelink synchronization signal in a first sidelink synchronization signal block from the first sidelink synchronization reference user equipment;

receiving a second sidelink synchronization signal in a second sidelink synchronization signal block from the second sidelink synchronization reference user equipment;

determining the first synchronization error based on the first sidelink synchronization signal and the second sidelink synchronization signal.

4. The apparatus of claim 1, wherein determining the second synchronization error between the first sidelink synchronization reference user equipment and the apparatus is based on a first sidelink synchronization signal and/or a level of synchronization accuracy of the apparatus.

5. The apparatus of claim 1, wherein determining whether to operate the apparatus as a sidelink synchronization reference user equipment and extend the synchronization coverage of the first sidelink synchronization reference user equipment based on the first synchronization error and the second synchronization error comprises:

determining that the second synchronization error is greater than the first synchronization error by a threshold; and if so, determining to not operate the apparatus as a sidelink synchronization reference user equipment and not extend the synchronization coverage of the first sidelink synchronization reference user equipment.

6. The apparatus of claim 5, wherein determining to not operate the apparatus as a sidelink synchronization reference user equipment and not extend the synchronization coverage of the first sidelink synchronization reference user equipment comprises:

determining to stop operating the apparatus as a sidelink synchronization reference user equipment and to stop extending the synchronization coverage of the first sidelink synchronization reference user equipment.

7. The apparatus of claim 1, wherein determining whether to operate the apparatus as a sidelink synchronization reference user equipment and extend the synchronization coverage of the first sidelink synchronization reference user equipment based on the first synchronization error and the second synchronization error comprises:

determining that the second synchronization error is greater than the first synchronization error by a threshold; and if so, determining to operate the apparatus as a sidelink synchronization reference user equipment and extend the synchronization coverage of the first sidelink synchronization reference user equipment.

8. The apparatus of claim 1, wherein determining whether to operate the apparatus as a sidelink synchronization reference user equipment and extend the synchronization coverage of the first sidelink synchronization reference user equipment based on the first synchronization error and the second synchronization error comprises:

determining that the second synchronization error is lower than the first synchronization error by a threshold; and if so, determine to operate the apparatus as a sidelink synchronization reference user equipment and extend the synchronization coverage of the first sidelink synchronization reference user equipment.

9. The apparatus of claim 8, wherein determining whether to operate the apparatus as a sidelink synchronization reference user equipment and extend the synchronization coverage of the first sidelink synchronization reference user equipment based on the first synchronization error and the second synchronization error further comprises:

determining that a signal for the second sidelink synchronization reference user equipment is lower than a signal threshold, wherein the signal threshold is dependent on the first synchronization error or on a difference between the first synchronization error and the second synchronization error; and if so, determine to operate the apparatus as a sidelink synchronization reference user equipment and extend the synchronization coverage of the first sidelink synchronization reference user equipment.

10. The apparatus of claim 1, comprising:

adjusting at least one sidelink synchronization information or transmission parameter of a sidelink synchronization signal block to increase or reduce the probability of being selected as a synchronization source by a neighboring user equipment.

11. The apparatus of claim 10, wherein adjusting at least one sidelink synchronization information or transmission parameter to increase or reduce the probability of being selected as a synchronization source by a neighboring user equipment comprises:

changing an in coverage indicator to indicate that the apparatus is in coverage of a base station or a global navigation synchronization system to increase the probability of being selected as a synchronization source by a neighboring user equipment;

changing an in coverage indicator to indicate that the apparatus is out of coverage of a base station or a global navigation synchronization system to reduce the probability of being selected as a synchronization source by a neighboring user equipment;

increasing a transmission power to increase the probability of being selected as a synchronization source by a neighboring user equipment; or reducing a transmission power to reduce the probability of being selected as a synchronization source by a neighboring user equipment.

12. The apparatus of claim 1, wherein operating the apparatus as synchronization reference user equipment comprises:

transmitting sidelink synchronization information in a sidelink synchronization signal block.

13. The apparatus of claim 12, wherein operating the apparatus as synchronization reference user equipment comprises:

transmitting a cause indicator indicating a cause for operating the apparatus as synchronization reference user equipment; and/or transmitting an availability indicator indicating the availability of the second synchronization reference user equipment extending the synchronization coverage of the first synchronization reference user equipment.

14. A method for use in an apparatus comprising:

determining that a second sidelink synchronization reference user equipment extends synchronization coverage of a first sidelink synchronization reference user equipment;

determining a first synchronization error between the first sidelink synchronization reference user equipment and the second sidelink synchronization reference user equipment and a second synchronization error between the first sidelink synchronization reference user equipment and the apparatus; and determining whether to operate the apparatus as a sidelink synchronization reference user equipment and extend the synchronization coverage of the first sidelink synchronization reference user equipment based on the first synchronization error and the second synchronization error or reporting the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

15. A non-transitory computer readable medium comprising program instructions which, when run on one or more processors, causes an apparatus to perform:

determining that a second sidelink synchronization reference user equipment extends synchronization coverage of a first sidelink synchronization reference user equipment;

determining a first synchronization error between the first sidelink synchronization reference user equipment and the second sidelink synchronization reference user equipment and a second synchronization error between the first sidelink synchronization reference user equipment and the apparatus; and determining whether to operate the apparatus as a sidelink synchronization reference user equipment and extend the synchronization coverage of the first sidelink synchronization reference user equipment based on the first synchronization error and the second synchronization error or reporting the first synchronization error and the second synchronization error to another apparatus to allow the other apparatus to determine whether to operate the apparatus as a sidelink synchronization reference user equipment and extend the synchronization coverage of the first sidelink synchronization reference user equipment based on the first synchronization error and the second synchronization error.

16. The method of claim 14, wherein determining that the second sidelink synchronization reference user equipment extends the synchronization coverage of the first sidelink synchronization reference user equipment is based on at least one of:

a first sidelink synchronization identifier transmitted by the first sidelink synchronization reference user equipment;

a second sidelink synchronization identifier transmitted by the second sidelink synchronization reference user equipment;

a first in coverage indicator indicating whether the first sidelink synchronization reference user equipment is in coverage of a base station or a global navigation synchronization system; or a second in coverage indicator indicating whether the second sidelink synchronization reference user equipment is in coverage of a base station or a global navigation synchronization system.

17. The method of claim 14, wherein determining the first synchronization error between the first sidelink synchronization reference user equipment and the second sidelink synchronization reference user equipment comprises:

receiving a first sidelink synchronization signal in a first sidelink synchronization signal block from the first sidelink synchronization reference user equipment;

receiving a second sidelink synchronization signal in a second sidelink synchronization signal block from the second sidelink synchronization reference user equipment;

determining the first synchronization error based on the first sidelink synchronization signal and the second sidelink synchronization signal.

18. The method of claim 14, wherein determining the second synchronization error between the first sidelink synchronization reference user equipment and the apparatus is based on a first sidelink synchronization signal and/or a level of synchronization accuracy of the apparatus.

19. The method of claim 14, wherein determining whether to operate the apparatus as a sidelink synchronization reference user equipment and extend the synchronization coverage of the first sidelink synchronization reference user equipment based on the first synchronization error and the second synchronization error comprises:

determining that the second synchronization error is greater than the first synchronization error by a threshold; and if so, determining to not operate the apparatus as a sidelink synchronization reference user equipment and not extend the synchronization coverage of the first sidelink synchronization reference user equipment.

20. The method of claim 19, wherein determining to not operate the apparatus as a sidelink synchronization reference user equipment and not extend the synchronization coverage of the first sidelink synchronization reference user equipment comprises:

determining to stop operating the apparatus as a sidelink synchronization reference user equipment and to stop extending the synchronization coverage of the first sidelink synchronization reference user equipment.

* * * * *